US012674986B2

(12) United States Patent
Plopski et al.

(10) Patent No.: US 12,674,986 B2
(45) Date of Patent: Jul. 7, 2026

(54) ADJUSTABLE DISPLAY ARRANGEMENT FOR EXTENDED REALITY DEVICES

(71) Applicant: Snap Inc., Santa Monica, CA (US)

(72) Inventors: Alexander Plopski, Graz (AT);
Christoph Ebner, Graz (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/636,606

(22) Filed: Apr. 16, 2024

(65) Prior Publication Data

US 2025/0321424 A1     Oct. 16, 2025

(51) Int. Cl.
| | |
|---|---|
| *G02B 27/01* | (2006.01) |
| *H04N 13/344* | (2018.01) |
| *H04N 13/361* | (2018.01) |
| *H04N 13/383* | (2018.01) |

(52) U.S. Cl.
CPC ....... *G02B 27/0172* (2013.01); *H04N 13/344* (2018.05); *H04N 13/361* (2018.05); *H04N 13/383* (2018.05); *G02B 2027/0123* (2013.01); *G02B 2027/014* (2013.01)

(58) Field of Classification Search
CPC ...... G06F 3/011; G06F 3/04815; G06F 3/013; G02B 27/0172; G02B 2027/0123; G02B 2027/014; G02B 2027/0178; G02B 27/017; H04N 13/346; G06T 19/006; G06V 20/20
See application file for complete search history.

(56) References Cited

U.S. PATENT DOCUMENTS

| | | | |
|---|---|---|---|
| 5,986,811 | A | 11/1999 | Wohlstadter |
| 6,014,259 | A | 1/2000 | Wohlstadter |
| 6,139,145 | A | 10/2000 | Israel |
| 10,509,228 | B1 | 12/2019 | Sulai et al. |
| 2010/0149073 | A1 | 6/2010 | Chaum et al. |
| 2011/0157707 | A1 | 6/2011 | Tilleman et al. |
| 2011/0234476 | A1 | 9/2011 | Sugihara et al. |
| 2011/0235186 | A1 | 9/2011 | Blum et al. |
| 2012/0086625 | A1 | 4/2012 | Takeda et al. |
| 2013/0300634 | A1 | 11/2013 | White et al. |

(Continued)

FOREIGN PATENT DOCUMENTS

| | | |
|---|---|---|
| JP | 2016195312 A | 11/2016 |
| WO | WO-2025221511 A1 | 10/2025 |
| WO | WO-2025221549 A1 | 10/2025 |

OTHER PUBLICATIONS

Dunn, David, "Required Accuracy of Gaze Tracking for Varifocal Displays", IEEE Conference on Virtual Reality and 3D User Interfaces (VR), (2019), 1838-1842.

(Continued)

*Primary Examiner* — Robin J Mishler

(74) *Attorney, Agent, or Firm* — Schwegman Lundberg & Woessner, P.A.

(57) ABSTRACT

A head-wearable extended reality (XR) device includes a display arrangement. The display arrangement has a display to display virtual content, and also has one or more optical elements to direct the virtual content along an optical path to an eye of a user of the XR device. The virtual content is presented in a virtual content field of view. The display arrangement further includes an adjustment mechanism to alter the optical path so as to adjust the virtual content field of view between at least two display modes.

20 Claims, 13 Drawing Sheets

(56) References Cited

U.S. PATENT DOCUMENTS

| | | | | |
|---|---|---|---|---|
| 2015/0205126 A1 | 7/2015 | Schowengerdt | | |
| 2017/0168307 A1 | 6/2017 | Itani | | |
| 2018/0330527 A1 | 11/2018 | Corcoran | | |
| 2019/0346918 A1* | 11/2019 | Akkaya | | G02B 27/0075 |
| 2019/0377122 A1 | 12/2019 | Danziger | | |
| 2020/0137380 A1 | 4/2020 | Supikov et al. | | |
| 2021/0149203 A1* | 5/2021 | Chen | | G02B 27/0172 |
| 2021/0165221 A1 | 6/2021 | Hasegawa et al. | | |
| 2021/0286428 A1* | 9/2021 | Chou | | G06F 3/14 |
| 2021/0302756 A1 | 9/2021 | Makinen et al. | | |
| 2022/0019282 A1 | 1/2022 | Zhou et al. | | |
| 2022/0075199 A1* | 3/2022 | Trisnadi | | G09G 3/32 |
| 2022/0155611 A1 | 5/2022 | Ojala et al. | | |
| 2022/0311990 A1 | 9/2022 | Makinen et al. | | |
| 2023/0146677 A1* | 5/2023 | Woo | | G06F 3/017 |
| | | | | 345/156 |
| 2024/0104877 A1* | 3/2024 | Henderson | | G06T 19/20 |
| 2024/0242450 A1* | 7/2024 | Connor | | G02B 27/0172 |
| 2024/0357232 A1 | 10/2024 | Lu et al. | | |
| 2025/0322597 A1 | 10/2025 | Plopski et al. | | |

OTHER PUBLICATIONS

Ebner, Christoph, "Video See-Through Mixed Reality with Focus Cues", IEEE Transactions on Visualization and Computer Graphics, vol. 28, No. 5, (May 2022), 2256-2266.

"International Application Serial No. PCT/US2025/023682, International Search Report mailed Jul. 4, 2025", 3 pgs.

"International Application Serial No. PCT/US2025/023682, Written Opinion mailed Jul. 4, 2025", 5 pgs.

Huang, Fu-Chung, et al., "The Light Field Stereoscope: Immersive Computer Graphics via Factored Near-Eye Light Field Displays with Focus Cues", Siggraph 2015, ACM, (2015), 12 pgs.

"U.S. Appl. No. 18/636,530, Non Final Office Action mailed Oct. 6, 2025", 24 pgs.

"International Application Serial No. PCT/US2025/023920, International Search Report mailed Aug. 4, 2025", 4 pgs.

"International Application Serial No. PCT/US2025/023920, Written Opinion mailed Aug. 4, 2025", 4 pgs.

"U.S. Appl. No. 18/636,530, Examiner Interview Summary mailed Dec. 18, 2025", 2 pgs.

"U.S. Appl. No. 18/636,530, Response filed Dec. 31, 2025 to Non Final Office Action mailed Oct. 6, 2025", 9 pgs.

* cited by examiner

100

REAL-WORLD ENVIRONMENT

110

XR DEVICE

PHYSICAL OBJECT

108

USER

106

102

104 NETWORK

112 SERVER

300

302

DEVICE FIELD OF VIEW

300

DEVICE FIELD OF VIEW

Figure 11:
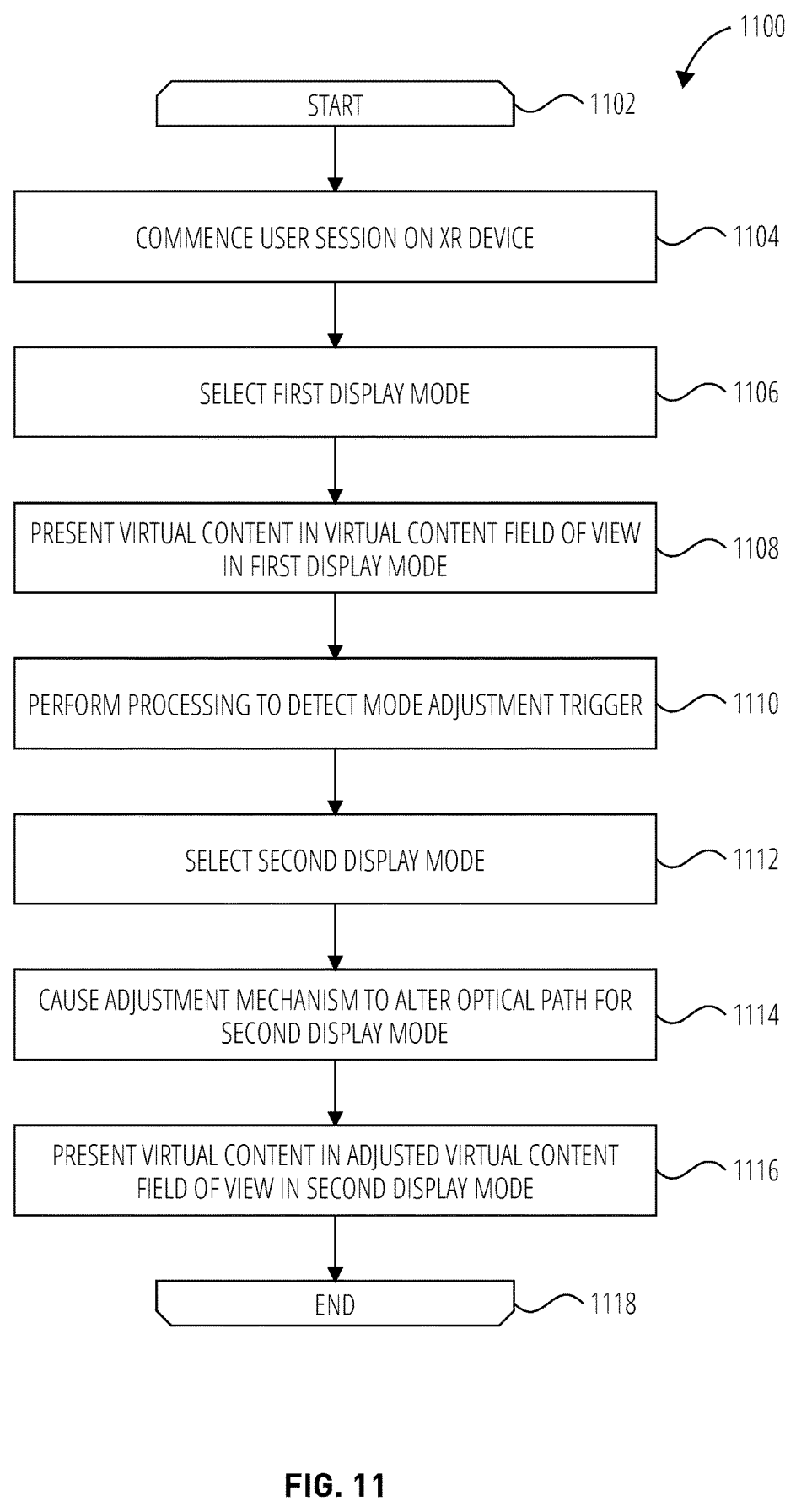

1100

START — 1102

COMMENCE USER SESSION ON XR DEVICE — 1104

SELECT FIRST DISPLAY MODE — 1106

PRESENT VIRTUAL CONTENT IN VIRTUAL CONTENT FIELD OF VIEW IN FIRST DISPLAY MODE — 1108

PERFORM PROCESSING TO DETECT MODE ADJUSTMENT TRIGGER — 1110

SELECT SECOND DISPLAY MODE — 1112

CAUSE ADJUSTMENT MECHANISM TO ALTER OPTICAL PATH FOR SECOND DISPLAY MODE — 1114

PRESENT VIRTUAL CONTENT IN ADJUSTED VIRTUAL CONTENT FIELD OF VIEW IN SECOND DISPLAY MODE — 1116

END — 1118

Figure 13:
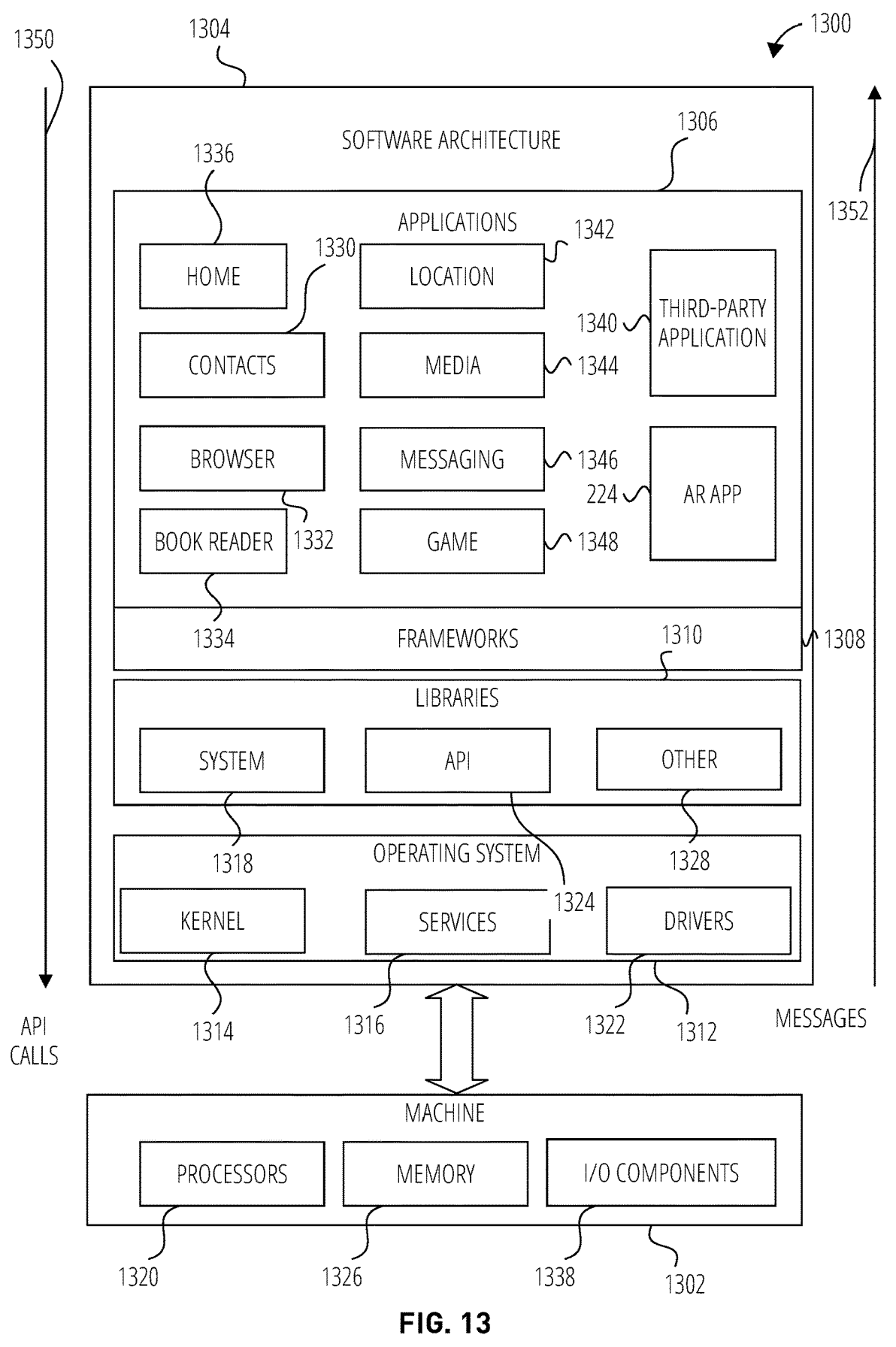

SOFTWARE ARCHITECTURE

1306

1336

APPLICATIONS

1342

HOME

1330

LOCATION

1340

THIRD-PARTY
APPLICATION

CONTACTS

MEDIA

1344

BROWSER

MESSAGING

1346

224

AR APP

BOOK READER

1332

GAME

1348

1334

FRAMEWORKS

1310

1308

LIBRARIES

SYSTEM

API

OTHER

1318

OPERATING SYSTEM

1328

KERNEL

SERVICES

1324

DRIVERS

1314

1316

1322

1312

API
CALLS

MESSAGES

1352

MACHINE

PROCESSORS

MEMORY

I/O COMPONENTS

ADJUSTABLE DISPLAY ARRANGEMENT FOR EXTENDED REALITY DEVICES

TECHNICAL FIELD

Subject matter disclosed herein relates, generally, to extended reality (XR). More specifically, but not exclusively, the subject matter relates to an adjustable display arrangement for an XR device.

BACKGROUND

The field of XR continues to grow. Some XR devices are able to overlay virtual content onto, or mix virtual content into, a user's perception of reality, providing a user experience that can be entertaining, informative, or useful.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

FIG. 11 is a flowchart illustrating a method suitable for adjusting an XR device from a first display mode to a second display mode, according to some examples.

Figure 12:
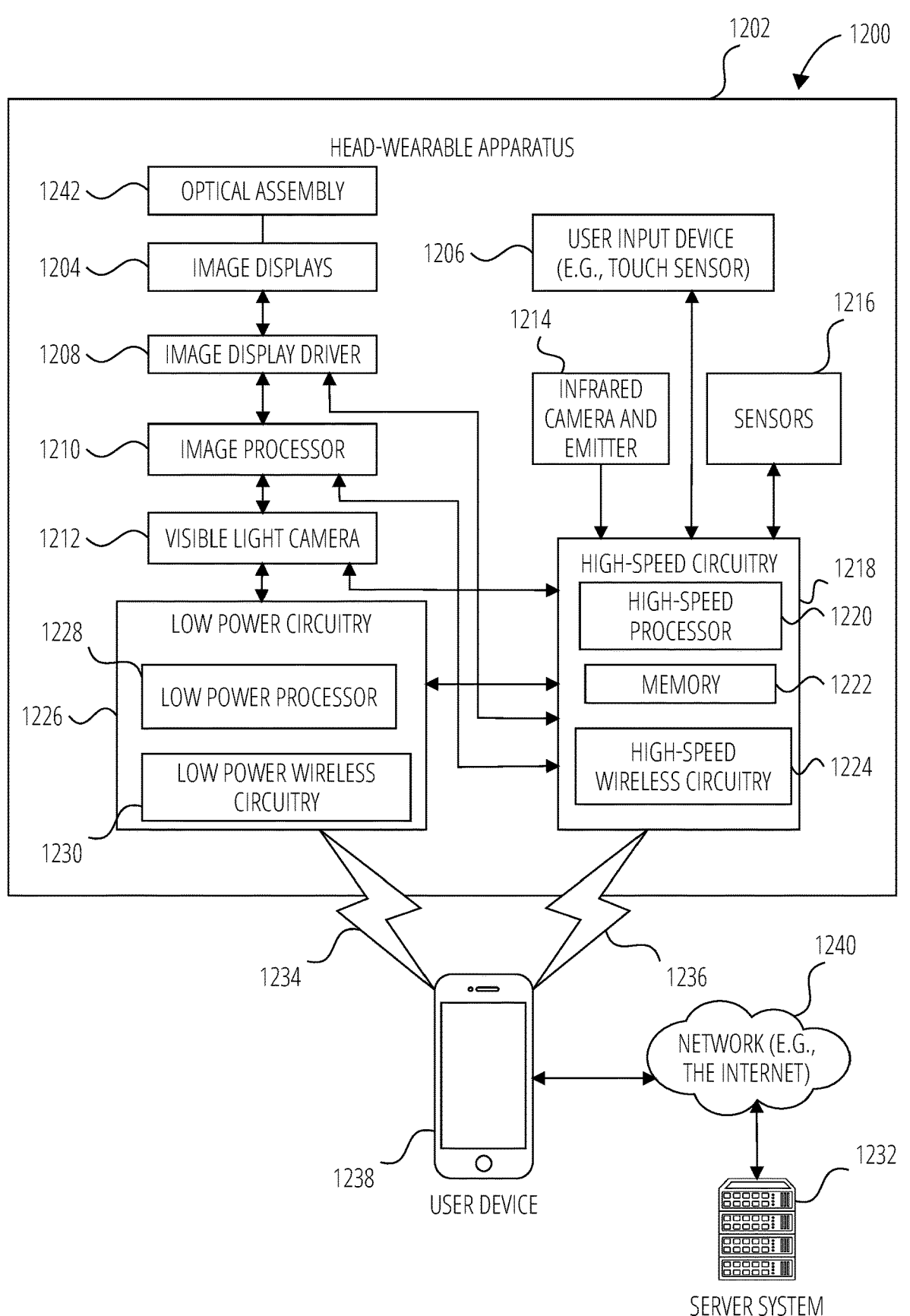

FIG. 12 illustrates a network environment in which a head-wearable apparatus can be implemented, according to some examples.

FIG. 13 is a block diagram showing a software architecture within which the present disclosure may be implemented, according to some examples.

Figure 14:
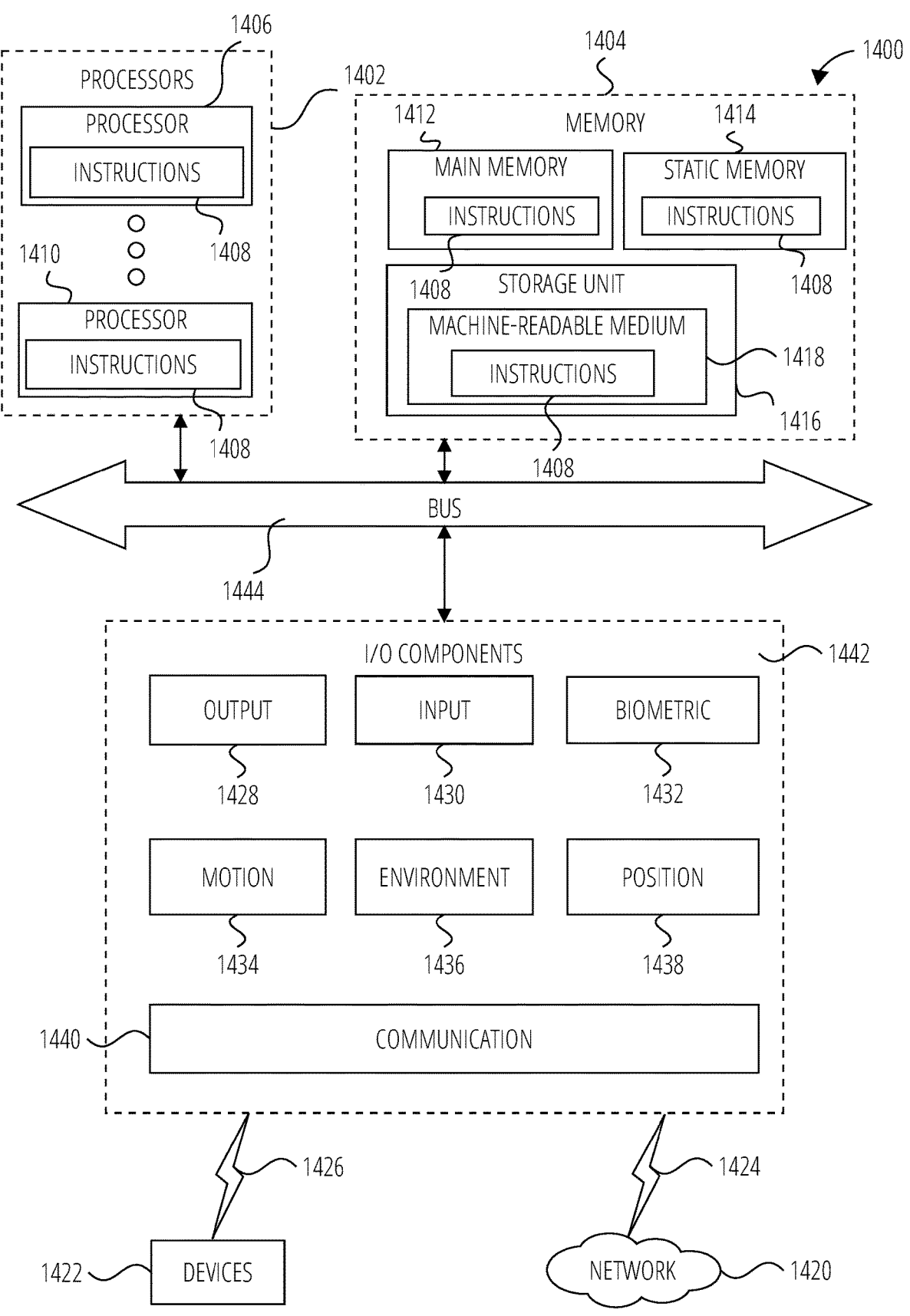

FIG. 14 is a diagrammatic representation of a machine in the form of a computer system within which a set of instructions may be executed for causing the machine to perform any one or more of the methodologies discussed herein, according to some examples.

DETAILED DESCRIPTION

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., hardware structures) are optional and may be combined or subdivided, and operations (e.g., in a procedure, algorithm, or other function) may vary in sequence or be combined or subdivided.

Examples described herein therefore provide an XR device with a non-static virtual content field of view. The XR device utilizes adjustable display arrangement elements, such as rotatable or displaceable elements, to enhance the flexibility of the XR device. According to some examples, the presently described devices, systems, or methodologies provide an improvement to an operation of the functioning of a computer by providing an XR device that can dynamically switch between different display modes to change its virtual content field of view.

The field of XR includes augmented reality (AR) and virtual reality (VR). AR may include an interactive experience of a real-world environment where physical objects or environments that reside in the real world are "augmented" or enhanced by computer-generated digital content (also referred to as virtual content). AR may include a system that enables a combination of real and virtual worlds, real-time interaction, and three-dimensional (3D) presentation of virtual and real objects. A user of an AR system may perceive virtual content that appears to be attached or interact with a real-world physical object. In some examples, AR overlays digital content on the real world. Alternatively, or additionally, AR combines real-world and digital elements. The term "AR" may thus include mixed reality experiences. The term "AR application" is used herein to refer to a computer-operated application that enables an AR experience.

VR may include a simulation experience of a virtual-world environment that is distinct from the real-world environment. Computer-generated digital content is displayed in the virtual-world environment. VR may also refer to a system that enables a user to be completely immersed in the virtual-world environment and to interact with virtual objects presented in the virtual-world environment. While examples described in the present disclosure focus primarily on XR devices that provide an AR experience, it will be appreciated that at least some aspects of the present disclosure can also be applied to VR.

A "user session" is used herein to refer to an operation of a device or application during periods of time. For example, a user session can include an operation of an AR application executing on a head-wearable XR device between the time the user puts on the XR device and the time the user takes off the head-wearable device. In some examples, a user session starts when an XR device is turned on or is woken up from sleep mode and stops when the XR device is turned off or placed in sleep mode. In other examples, the user session starts when the user runs or starts an AR application, or runs or starts a particular feature of the AR application, and stops when the user ends the AR application or stops the particular feature of the AR application.

A head-wearable XR device can display virtual content in different ways. For example, certain head-wearable AR devices can be categorized as having optical sec-through (OST) displays or video pass-through (VPT) displays. In OST technologies, a user views the physical environment directly through transparent or semi-transparent display components, and virtual content can be rendered to appear as part of, or overlaid upon, the physical environment. In VPT technologies, a view of the physical environment is captured by one or more cameras and then presented to the user on an opaque display (e.g., in combination with virtual content). While examples described in the present disclosure focus primarily on OST display arrangements, it will be appreciated that aspects of the present disclosure may also be applied to other types of displays, such as VPT display arrangement.

A "virtual content field of view," as referred to herein, includes an area in which virtual content is presented or can be presented to a user. The virtual content field of view defines the extent of a perceived area that is presented to the user via a display arrangement of the XR device. In some cases, virtual content in the virtual content field of view is directed from a display to the eyes of the user via one or more optical elements of the display arrangement, such as lenses, mirrors, or waveguides. Virtual content can cover all or part of the virtual content field of view at a particular point in time. For example, the virtual content field of view can be fully covered with a graphical user interface of an AR application or only partially covered with one or more virtual objects that are overlaid onto real-world objects. In some XR devices, the virtual content field of view is perceived within a segment of an overall field of view that can be observed by the user through the XR device (the overall field of view is also referred to herein as the "device field of view"), while in other XR devices, the virtual content field of view covers the entire device field of view. A virtual content field of view may present virtual content at a virtual image plane, which can be at a fixed distance from the user or an adjustable distance from the user (e.g., through a varifocal mechanism).

In at least some XR devices, such as those with OST display arrangements, the orientation, extent, or position of the virtual content field of view may be limited by the structure or components of the XR device. For example, an OST display arrangement can include a screen with a fixed size and orientation relative to the user of the XR device, resulting in a fixed virtual content field of view. As a result, while the XR device can adjust virtual content that is displayed in the virtual content field of view (e.g., by cropping or otherwise adjusting the virtual content so that it covers only a segment within the virtual content field of view to achieve a desired aspect ratio for the user to observe), it is not capable of adjusting the orientation, extent, or position of the virtual content field of view itself.

An XR device can be designed so as to have a virtual content field of view that presents virtual content in a portrait mode (e.g., virtual content can only be presented within a relatively tall but narrow zone within the field of view). This design can be useful for certain XR experiences, such as AR applications that augment human figures, present readable text (e.g., a book), or present navigable content feeds. Alternatively, an XR device can be designed so as to have a virtual content field of view that presents virtual content in a landscape mode (e.g., virtual content can only be presented in a relatively wide but short zone within the field of view). Such a design can be useful for other XR experiences, such as games or XR experiences that display panoramic landscape content.

This one-size-fits-all approach limits the capabilities of an XR device, and thus also the adoption thereof. It also forces developers to design applications within the constraints of a certain display mode, potentially leading to suboptimal outcomes. For example, in an XR device with a portrait mode setup, the developer can design an application such that the virtual content is cropped or otherwise adjusted to appear in a landscape orientation within a segment of the virtual content field of view, but this can result in a significant portion of the available area of the virtual content field of view being lost and the user being presented with a relatively small image or virtual object. Accordingly, a lack of adaptability in the display arrangement hinders the potential of XR experiences.

Examples described herein provide an adjustable display arrangement for an XR device, enabling the XR device to switch between different display modes, such as a portrait mode and a landscape mode. In some examples, the display arrangement incorporates an adjustment mechanism that alters an optical path of virtual content to enable display mode switching. In this way, the virtual content field of view itself can be adjusted between display modes, potentially obviating the need for virtual content to be cropped or otherwise adjusted to obtain it in a particular orientation inside of a fixed virtual content field of view. This flexibility provides a more adaptable virtual content field of view, thereby providing a technical benefit that enhances user experience.

In some examples, an XR device that has a display arrangement as described herein is enabled to dynamically adapt to custom configurations of a particular application or manual selections made by a user. Examples in the present disclosure allow for more efficient use of an available field of view, ensuring that virtual content is presented in an effective manner, and opening up new possibilities for developers to produce richer and more diverse XR content.

An XR device can include a display arrangement that comprises a display, one or more optical elements, and an adjustment mechanism. The optical elements direct virtual content from the display along an optical path to an eye (or both eyes) of a user of the XR device. The virtual content is presented in a virtual content field of view as described above. The adjustment mechanism is configured to alter the optical path so as to adjust the virtual content field of view between at least two display modes.

The display and the one or more optical elements can be configured for one or both eyes of the user. Accordingly, in some cases, the display and the one or more optical elements are a first set that includes a display and one or more optical elements for a first eye of the user, and the XR device further includes a similar second set for a second eye of the user, that includes a further display and one or more further optical elements.

In some examples, there are at least two display modes that include a portrait mode and a landscape mode. However, it is noted that portrait mode and landscape mode are non-limiting examples and other modes or orientations can be provided in addition to, or alternatively to, portrait mode and/or landscape mode.

The optical path includes a "trajectory," "route," or "track" that light follows from a zone of origin (e.g., a display, such as a screen or projector) within an XR device to a user's eye to allow virtual content to be perceived by the eye. The light can interact with optical elements along the optical path. As used herein, an "optical path" can include not only an overall route followed by light but also other characteristics, such as direction, orientation, position in space, or position relative to XR device components or the user. The optical path may be influenced by various components, such as lenses, mirrors, prisms, waveguides, and other elements that can reflect, refract, or otherwise manipulate the light.

For example, with an optical assembly of the XR device in a first position relative to a frame of the XR device, virtual content is directed along a first optical path that causes the virtual content to be presented in a virtual content field of view that has a portrait mode or orientation. Then, as a result of rotation of the optical assembly relative to the frame, a second optical path is defined. The second optical path is an altered version of the first optical path since light that is traveling from the display will be positioned spatially differently relative to the frame (as well as the user's eye). Thus, the second optical path causes the virtual content to be presented, for example, in an adjusted virtual content field of view that has a landscape mode or orientation. In such a case, while the general route followed by the light to reach the user's eye may be similar in each case, the configuration or spatial positioning of the light has changed to provide the landscape mode, and it thus can be said that the optical path has changed.

In some examples, the adjustment of the virtual content field of view comprises adjustment of an aspect ratio of the virtual content field of view from a viewing perspective of the user. An adjustment mechanism includes one or more components to enable or facilitate modification of the optical path. The adjustment mechanism includes, for example, one or more mechanical actuators, such as motors or servos that rotate or displace optical elements, one or more electro-optical components, such as liquid crystal on silicon (LCoS) devices that change light direction, one or more magnetic systems that move optical elements into and out of the light path, or combinations thereof.

In some examples, the adjustment mechanism is configured to alter the optical path in different ways, such as by adjusting the display, adjusting the one or more optical elements, or adjusting both the display and the one or more optical elements. The adjustment can include causing rotation of the display and/or the one or more optical elements (e.g., relative to a frame or other XR device components).

For example, the XR device includes an optical assembly that includes the display and the one or more optical elements, with the adjustment mechanism operatively altering the optical path by causing rotation of the optical assembly. The XR device automatically adjusts the orientation of the optical assembly within the XR device by, for example, rotating the optical assembly based on the content to be displayed to the user.

The adjustment mechanism can, alternatively or additionally, displace one or more components relative to other XR device components to alter the optical path. For example, the adjustment mechanism operatively causes displacement of at least a subset of the one or more optical elements into or out of the optical path, thereby changing the virtual content field of view from one display mode to another display mode.

In some examples, the adjustment mechanism adjusts the virtual content field of view in response to detection, by the XR device, of a mode adjustment trigger. As used herein, a "mode adjustment trigger" includes an event, signal, or input that indicates to the XR device to change the configuration of the virtual content field of view, such as switching between portrait and landscape modes. The mode adjustment trigger can be initiated based on one or more sources or events, such as user input, sensor data, application requirements, or content type of the virtual content. For instance, a mode adjustment trigger can be detected when a user selects a different viewing mode via a physical button or gesture, when an application launches that is best viewed in a specific orientation, or when the XR device's sensors detect a change in the user's activity that warrants a different virtual content field of view. In some examples, the XR device interprets or processes the mode adjustment trigger and commands the adjustment mechanism to reconfigure the optical path accordingly.

An example method performed by the XR device includes displaying virtual content via the display of the display arrangement, directing, via the one or more optical elements, the virtual content along an optical path to an eye of a user of the XR device, and altering the optical path so as to adjust the virtual content field of view between display modes.

In some examples, the method includes adjusting a rendering format of the virtual content to synchronize or align the virtual content with the display mode of the virtual content field of view. For example, when transitioning from a first display mode to a second display mode, the XR device can automatically adjust the rendering format to correspond to the second display mode. As used herein, a "rendering format" includes a configuration, specification, or instructions used to generate and virtual content for presentation within the virtual content field of view of an XR device. A rendering format can include one or more of aspect ratio, resolution, content color depth, frame rate, and other graphical parameters that define how virtual content is visually represented. In some examples, the rendering format is adapted to match the characteristics of the display and the optical system, as well as the requirements of the virtual content itself. Adjustments to the rendering format can include aspect ratio corrections of virtual objects, other changes to virtual objects (e.g., changing orientation or proportions), viewport adjustments, or display angle changes.

The method performed by the XR device can include identifying a display mode from among the at least two display modes, causing the adjustment mechanism to adjust the virtual content field of view to correspond to the identified display mode, rendering the virtual object using a rendering format that corresponds to the identified display mode, and displaying the virtual object via the display.

One or more of the methodologies described herein obviate or reduce a need for certain efforts or computing resources. Examples of computing resources that may be obviated or reduced include processor cycles, network traffic, memory usage, data storage capacity, power consumption, network bandwidth, or cooling capacity. For example, to provide a landscape mode, the XR device mechanically rotates its optical assembly relative to a frame and optical combiner of the XR device, obviating the need to perform cropping or other image processing operations to present virtual content in a segment of a fixed virtual content field of view that has a desired aspect ratio. In some examples, the XR device has a virtual content field of view that does not cover the entire device field of view. The virtual content field of view is dynamically adjusted (e.g., rotated) within the device field of view to present virtual content in multiple display modes, facilitating or enabling the use of a smaller and/or higher resolution display that is still able to achieve effective mode adjustments to display rich or diverse content.

Figure 1:
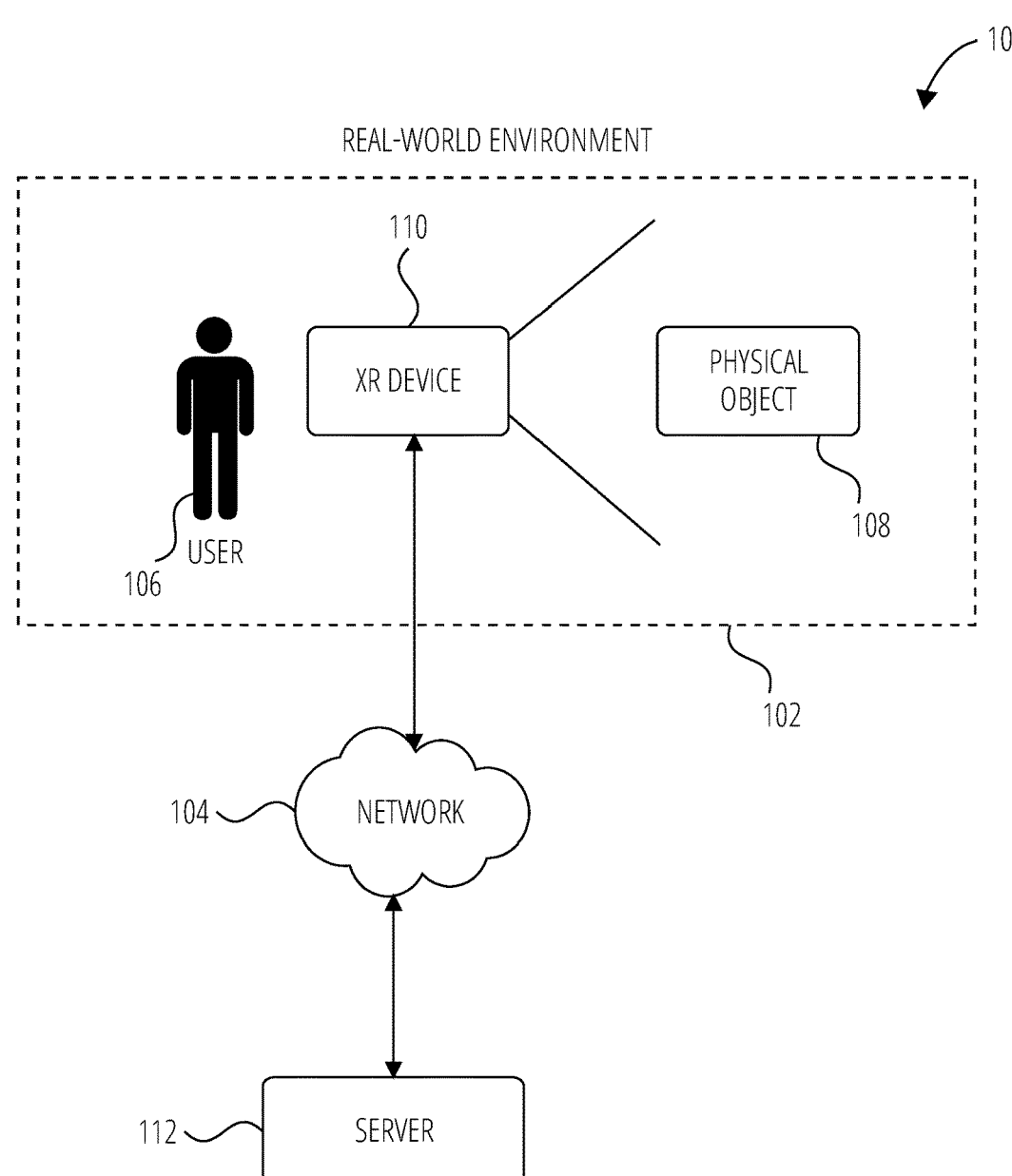
FIG. 1 is a block diagram illustrating a network environment for operating an XR device, according to some examples.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system can be or include a cloud-based server system that provides additional information, such as virtual content (e.g., 3D models of virtual objects, or augmentations to be applied as virtual overlays onto images depicting real-world scenes) to the XR device 110.

A user 106 operates the XR device 110. The user 106 is a human user (e.g., a human being), a machine user (e.g., a computer configured by a software program to interact with the XR device 110), or any suitable combination thereof (e.g., a human assisted by a machine or a machine supervised by a human).

The user 106 is not part of the network environment 100, but is associated with the XR device 110. For example, where the XR device 110 is a head-wearable apparatus, the user 106 wears the XR device 110 during a user session.

The XR device 110 can have different display arrangements. In some examples, the display arrangement includes a display (e.g., a screen) that displays virtual content and/or what is captured with a camera of the XR device 110. The display can be positioned in the gaze path of the user or offset from the gaze path of the user. In some examples, the display arrangement is an OST arrangement. As described elsewhere herein, the display arrangement can include an adjustment mechanism that is configured to adjust the display and/or one or more other components in the display arrangement to provide a dynamically adjustable virtual content field of view.

In some examples, the user 106 operates an application of the XR device 110, referred to herein as an AR application (as an example of an XR application that can execute at the XR device 110). The AR application is configured to provide the user 106 with an experience triggered or enhanced by a physical object 108, such as a two-dimensional (2D) physical object (e.g., a picture), a 3D physical object (e.g., a statue), a location (e.g., at factory), or references (e.g., perceived corners of walls or furniture, or digital codes) in a real-world environment 102. For example, the user 106 can point a camera of the XR device 110 to capture an image of the physical object 108 and a virtual overlay may be presented over the physical object 108 via the display.

Experiences can also be triggered or enhanced by a hand or other body part of the user 106. For example, the XR device 110 detects and responds to hand gestures or signals. When using some XR devices, such as head-wearable devices (also referred to as head-mounted devices, or "HMDs"), the hand of the user serves as an interaction tool. As a result, the hand is often "visible" to the XR device 110, with virtual content being rendered to appear on or close to the hand.

The XR device 110 includes tracking components (not shown in FIG. 1). The tracking components track the pose (e.g., position and orientation) of the XR device 110 relative to the real-world environment 102 using image sensors (e.g., depth-enabled 3D camera and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102. In some examples, the tracking components track the pose of the hand (or hands) of the user 106 or some other physical object 108 in the real-world environment 102.

In some examples, the server 112 is used to detect and identify the physical object 108 based on sensor data (e.g., image and depth data) from the XR device 110, and determine a pose of the XR device 110, the physical object 108 and/or the hand of the user 106 based on the sensor data. The server 112 can also generate virtual content based on the pose of the XR device 110, the physical object 108, and/or the hand.

In some examples, the server 112 communicates virtual content (e.g., a virtual object) to the XR device 110. The XR device 110 or the server 112, or both, can perform image processing, object detection and object tracking functions based on images captured by the XR device 110 and one or more parameters internal or external to the XR device 110.

The object recognition, tracking, and content rendering can be performed on either the XR device 110, the server 112, or a combination between the XR device 110 and the server 112. Accordingly, while certain functions are described herein as being performed by either an XR device or a server, the location of certain functionality may be a design choice (unless specifically indicated to the contrary). For example, it might be technically preferable to deploy particular technology and functionality within a server system initially, but later to migrate this technology and functionality to a client installed locally at the XR device where the XR device has sufficient processing capacity.

One or more of the machines, components, or devices shown in FIG. 1 can be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 14. Moreover, two or more of the machines, components, or devices illustrated in FIG. 1 can be combined into a single machine, component, or device, and the functions described herein for any single machine, component, or device can be subdivided among multiple machines, components, or devices.

The network 104 can be any network that enables communication between or among machines (e.g., server 112), databases, or devices (e.g., XR device 110). Accordingly, the network 104 can be a wired network, a wireless network (e.g., a mobile or cellular network), or any suitable combination thereof. The network 104 can include one or more portions that constitute a private network, a public network (e.g., the Internet), or any suitable combination thereof.

Figure 2:
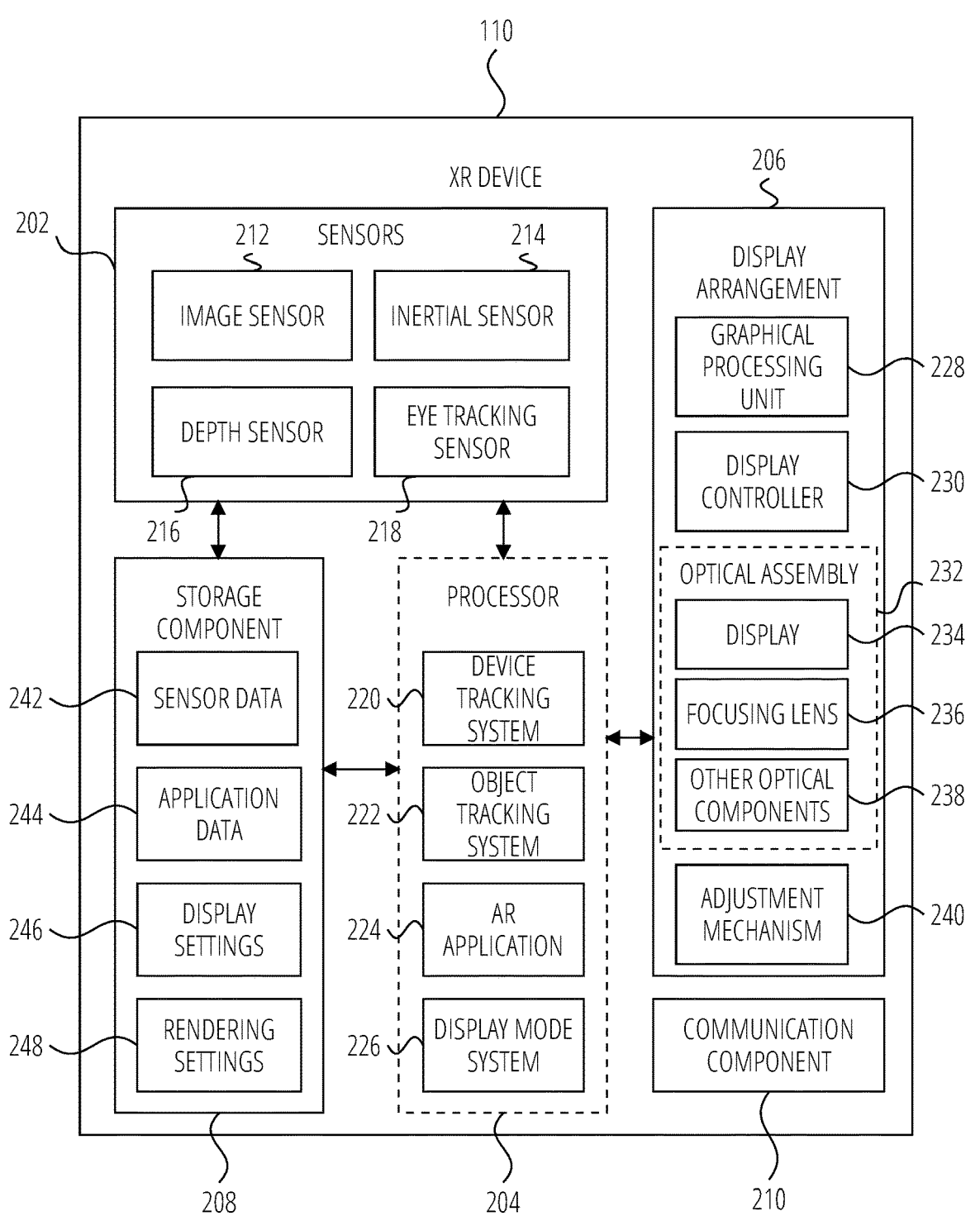
FIG. 2 is a block diagram illustrating components of an XR device, according to some examples.

FIG. 2 is a block diagram illustrating components (e.g., modules, parts, or systems) of the XR device 110 of FIG. 1, according to some examples. The XR device 110 is shown in FIG. 2 to include sensors 202, a processor 204, a display arrangement 206, a storage component 208, and a communication component 210. It will be appreciated that FIG. 2 is not intended to provide an exhaustive indication of components of the XR device 110.

The sensors 202 include one or more image sensors 212, one or more inertial sensors 214, one or more depth sensors 216, and one or more eye tracking sensors 218. The image sensor 212 can include, for example, a combination of a color camera, a thermal camera, a depth sensor, and one or multiple grayscale, global shutter tracking cameras.

In some examples, the inertial sensor 214 includes a combination of a gyroscope, accelerometer, and a magnetometer. In some examples, the inertial sensor 214 includes one or more Inertial Measurement Units (IMUs). An IMU enables tracking of movement of a body by integrating the acceleration and the angular velocity measured by the IMU. An IMU can include a combination of accelerometers and gyroscopes that can determine and quantify linear acceleration and angular velocity, respectively. The values obtained can be processed to obtain the pitch, roll, and heading of the IMU and, therefore, of the body with which the IMU is associated. Signals from the accelerometers of the IMU also can be processed to obtain velocity and displacement. The IMU may also include one or more magnetometers.

The depth sensor 216 may include one or a combination of a structured-light sensor, a time-of-flight sensor, passive stereo sensor, or an ultrasound device. The eye tracking sensor 218 is configured to monitor the gaze direction of the user, providing data for various applications, such as determining where to render virtual content of an AR application 224. The XR device 110 may include one or multiple of these sensors, such as infrared eye tracking sensors, corneal reflection tracking sensors, or video-based eye-tracking sensors.

Other examples of sensors 202 include a proximity or location sensor (e.g., near field communication, GPS, Bluetooth™, or Wi-Fi™), an audio sensor (e.g., a microphone), or any suitable combination thereof. It is noted that the sensors 202 described herein are for illustrative purposes and the sensors 202 are thus not necessarily limited to the ones described above.

The processor 204 executes or facilitates implementation of a device tracking system 220, an object tracking system 222, the AR application 224, and a display mode system 226.

The device tracking system 220 estimates a pose of the XR device 110. For example, the device tracking system 220 uses data from the image sensor 212 and the inertial sensor 214 to track a location and pose of the XR device 110 relative to a frame of reference (e.g., real-world environment 102). In some examples, the device tracking system 220 uses sensor data from the sensors 202 to determine the pose of the XR device 110. The pose may be a determined orientation and position of the XR device 110 in relation to the user's real-world environment 102.

In some examples, the device tracking system 220 continually gathers and uses updated sensor data describing movements of the XR device 110 to determine updated poses of the XR device 110 that indicate changes in the relative position and orientation of the XR device 110 from the physical objects in the real-world environment 102. In some examples, the device tracking system 220 provides the pose of the XR device 110 to a graphical processing unit 228 of the display arrangement 206.

The object tracking system 222 enables the tracking of an object, such as the physical object 108 of FIG. 1, or a hand of a user. The object tracking system 222 may include a computer-operated application or system that enables a device or system to track visual features identified in images captured by one or more image sensors, such as one or more cameras. In some examples, the object tracking system 222 builds a model of a real-world environment based on the tracked visual features. The object tracking system 222 may implement one or more object tracking machine learning models to track an object in the field of view of a user during a user session. The object tracking machine learning model may comprise a neural network trained on suitable training data to identify and track objects in a sequence of frames captured by the XR device 110. The object tracking machine learning model may use an object's appearance, motion, landmarks, and/or other features to estimate location in subsequent frames.

In some examples, the device tracking system 220 and/or the object tracking system 222 implements a "SLAM" (Simultaneous Localization and Mapping) system to understand and map a physical environment in real-time. This allows, for example, the XR device 110 to accurately place digital objects in the real world and track their position as a user moves and/or as objects move. The XR device 110 may include a "VIO" (Visual-Inertial Odometry) system that combines data from an IMU and a camera to estimate the position and orientation of an object in real-time.

The AR application 224 may retrieve virtual content, such as a virtual object (e.g., 3D object model) or other augmentation, based on an identified physical object 108, physical environment (or other real-world feature), or user input (e.g., a detected gesture). The graphical processing unit 228 of the display arrangement 206 causes display of the virtual object, augmentation, or the like.

In some examples, the AR application 224 includes a local rendering engine that generates a visualization of a virtual object overlaid (e.g., superimposed upon, mixed with, or otherwise displayed in tandem with) on an image of the physical object 108 (or other real-world feature) captured by the image sensor 212. A visualization of the virtual object may be manipulated by adjusting a position of the physical object or feature (e.g., its physical location, orientation, or both) relative to the image sensor 212. Similarly, the visualization of the virtual object may be manipulated by adjusting a pose of the XR device 110 relative to the physical object or feature.

The display arrangement 206 may further include a display controller 230, one or more displays 234, a focusing lens 236, and other optical components 238. In some examples, the display 234, the focusing lens 236, and/or other optical components 238 are part of an optical assembly 232 designed to guide, direct, manipulate, and/or focus light representing virtual content to the eyes of the user.

Referring generally to the optical assembly 232, the optical assembly 232 may include various optical components. In some examples, the optical assembly 232 includes one or more display components and one or more lenses, mirrors, waveguides, filters, diffusers, or prisms, which work together to present virtual content to the user. The design of the optical assembly 232 can vary depending on the desired field of view, image clarity, and form factor of the XR device 110.

The display 234 may include a screen or panel configured to display images generated by the processor 204 or the graphical processing unit 228. The display 234 may include one or more components or devices to present images, videos, or graphics to a user. The display 234 may be an electronic screen. Technologies such as LCDs, organic light-emitting diodes (OLEDs), micro-LEDs, or projection-based systems may be incorporated into the display 234.

In some examples, the display 234 is transparent or semi-transparent so that the user 106 can see through the display 234. In other examples, the display 234 is offset from a gaze path of the user, with the other optical components 238 (e.g., a half-mirror, waveguide, or beam splitter) directing light from the display 234 into the gaze path.

Optical lenses can be used to adjust the presentation of the virtual content to the user's eye. For example, where the display 234 comprises a projector system that projects images onto a near-eye display surface of the XR device 110, lenses can be placed on a user-facing side and/or an exterior side of the display surface to modulate the image plane in front of the user's eye where that the virtual content appears (e.g., to adjust the perceived distance of the virtual content from the user's eye). A near user-facing side lens (also called an eye-side lens) affects the perceived distance of the virtual content in front of the user (e.g., the image plane); while an exterior side lens (also called a world-side lens) is provided to neutralize the effect of the near side lens on real-world objects. In some examples, an ophthalmic lens can also be positioned on the eye side to allow users needing visual correction to correctly perceive the virtual content.

Referring again to the optical assembly 232, the focusing lens 236 is an example of an optical element that can focus light originating from the display 234 such that the user perceives images at a certain depth (e.g., at a predetermined image plane). As mentioned, virtual content is presented in a virtual content field of view, which may coincide with or be a segment within a device field of view.

In some examples, the display arrangement 206 further includes an adjustment mechanism 240. The adjustment mechanism 240 includes one or more components, devices, or systems integrated into the XR device 110 to enable the reconfiguration of the optical path or the repositioning of the optical assembly 232. The adjustment mechanism 240 is designed to facilitate changes in the virtual content field of view, such as switching between different display modes. The adjustment mechanism 240 can include mechanical components such as motors, gears, or actuators that physically move the optical assembly 232 or parts thereof, electronic or electro-optical components that alter the optical path without moving parts, and/or magnetic components that alter the optical path. For instance, and as described in greater detail elsewhere, the adjustment mechanism 240 might rotate a prism or lens to change the orientation of the virtual content field of view, and thus of the displayed content, from portrait to landscape mode.

In some examples, the adjustment mechanism 240 operates under the control of the display mode system 226, responding to mode adjustment triggers to provide the user of the XR device 110 with the appropriate viewing configuration. The display mode system 226 can be provided by one or more software modules responsible for managing various display modes available on the XR device 110, such as portrait and landscape orientations. It processes inputs, such as mode adjustment triggers, to determine the appropriate display mode for the virtual content and commands the adjustment mechanism 240 to reconfigure the optical path as needed. The display mode system 226 can work in conjunction with other components, such as the sensors 202, the AR application 224, or user input elements, to ensure a transition between modes. For example, the display mode system 226 can detect launching of the AR application 224 and identify that the AR application 224 is best executed with a virtual content field of view that has a landscape orientation, and then adjust the virtual content field of view (via the adjustment mechanism 240) to improve the user's experience.

Referring again to the graphical processing unit 228, the graphical processing unit 228 may include a render engine that is configured to render a frame of a 3D model of a virtual object based on the virtual content provided by the AR application 224 and the pose of the XR device 110 (and, in some cases, the position of a tracked object). In other words, the graphical processing unit 228 uses the pose information as well as predetermined content data to generate frames of virtual content to be presented on the display 234. For example, the graphical processing unit 228 uses the pose to render a frame of the virtual content such that the virtual content is presented at an orientation and position in the display 234 to properly augment the user's reality.

As an example, the graphical processing unit 228 may use the pose data to render a frame of virtual content such that, when presented on the display 234, the virtual content is caused to be presented to a user so as to overlap with a physical object in the user's real-world environment 102. The graphical processing unit 228 can generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

In some examples, the XR device 110 uses predetermined properties of a virtual object (e.g., an object model with certain dimensions, textures, transparency, and colors) along with lighting estimates and pose data to render virtual content within an XR environment in a way that is visually coherent with the real-world lighting conditions.

The graphical processing unit 228 may communicate with the display mode system 226 to ensure that content is rendered in a rendering format that corresponds with a current display mode. For example, upon switching from a portrait mode to a landscape mode, the display mode system 226 instructs the graphical processing unit 228 to generate virtual content using a landscape mode rendering format.

Referring again to the display arrangement 206, the graphical processing unit 228 transfers a rendered frame (with the virtual content to which the aforementioned processing has been applied) to the display controller 230. In some examples, the display controller 230 is positioned as an intermediary between the graphical processing unit 228 and the display 234, receives the image data (e.g., rendered frame) from the graphical processing unit 228, re-projects the frame (by performing a warping process) based on a latest pose of the XR device 110 (and, in some cases, object tracking pose forecasts or predictions), and provides the re-projected frame to the display 234.

It will be appreciated that, in examples where an XR device includes multiple displays, each display can have a dedicated graphical processing unit and/or display controller and/or optical assembly. It will further be appreciated that where an XR device includes multiple displays, e.g., in the case of AR glasses or another AR device that provides binocular vision to mimic the way humans naturally perceive the world, a left eye display arrangement and a right eye display arrangement may deliver separate images or video streams to each eye. Where an XR device includes multiple displays, steps may be carried out separately and substantially in parallel for each display and/or optical assembly, in some examples, and pairs of features or components may be included to cater for both eyes.

For example, an XR device captures separate images for a left eye display and a right eye display (or for a set of right eye displays and a set of left eye displays), and render separate outputs for each eye to create a more immersive experience and to adjust the focus and convergence of the overall view of a user for a more natural, 3D view. Thus, while a single set of display arrangement components may be discussed to describe some examples, e.g., a display 234 and focusing lens 236 that direct images to one eye, similar techniques may be applied to cover both eyes by providing a further set of display arrangement components. For example, an XR device includes separate optical assemblies for respective eyes, with one or more adjustment mechanisms being used to adjust the optical assemblies separately to switch between display modes.

The storage component 208 may store various data, such as sensor data 242, application data 244, display settings 246, and rendering settings 248. In some examples, some of the data of the storage component 208 are stored at the XR device 110 while other data are stored at the server 112.

Sensor data 242 may include data obtained from one or more of the sensors 202, such as image frames captured by the cameras and IMU data including inertial measurements. Application data 244 may include information and parameters specific to one or more applications installed on or accessible via the XR device 110. Application data 244 may include specifications and/or characteristics of virtual content as it should appear on an image plane from the user's perspective. In some examples, the application data 244 is utilized by the processor 204, including the display mode system 226, to tailor the virtual content field of view and rendering format to the requirements of each application. For instance, if an application is designed for architectural visualization, the application data 244 may specify a wide field of view to better display detailed building models and environments.

Display settings 246 may include configuration parameters that define how virtual content is presented on the XR device 110. The display settings 246 may include brightness, contrast, color calibration, resolution, and other display attributes that can be adjusted to enhance visual quality and performance. The display settings 246 can be accessed by the AR application 224, the display mode system 226, and/or the graphical processing unit 228 to ensure that the virtual content is rendered according to preferences and specifications.

Rendering settings 248 may include parameters and algorithms used to generate the virtual content within the XR device 110. The rendering settings 248 may dictate one or more rendering formats, such as an aspect ratio, field of view, depth of field, texture quality, or other graphical details for a particular rendering format. The rendering settings 248 may determine visual quality, performance, or rendering techniques used to generate the virtual environment.

The communication component 210 of the XR device 110 enables connectivity and data exchange. For example, the communication component 210 enables wireless connectivity and data exchange with external networks and servers, such as the server 112 of FIG. 1. This can allow certain functions described herein to be performed at the XR device 110 and/or at the server 112.

The communication component 210 allows the XR device 110 to transmit and receive data, including software updates, machine learning models, and cloud-based processing tasks. In some examples, the communication component 210 facilitates the offloading of computationally intensive tasks to the server 112. Additionally, the communication component 210 can allow for synchronization or networking with other devices in a multi-user XR environment, enabling participants to have a consistent and collaborative experience (e.g., in a multi-player AR game or an AR presentation mode).

In some examples, at least some of the components shown in FIG. 2 are configured to communicate with each other to implement aspects described herein. One or more of the components described can be implemented using software, hardware (e.g., one or more processors of one or more machines) or a combination of hardware and software. For example, a component described herein can be implemented by a processor configured to perform the operations described herein for that component. Moreover, two or more of these components can be combined into a single component, or the functions described herein for a single component can be subdivided among multiple components. Furthermore, according to various examples, components described herein can be implemented using a single machine, database, or device, or be distributed across multiple machines, databases, or devices.

Figure 3:
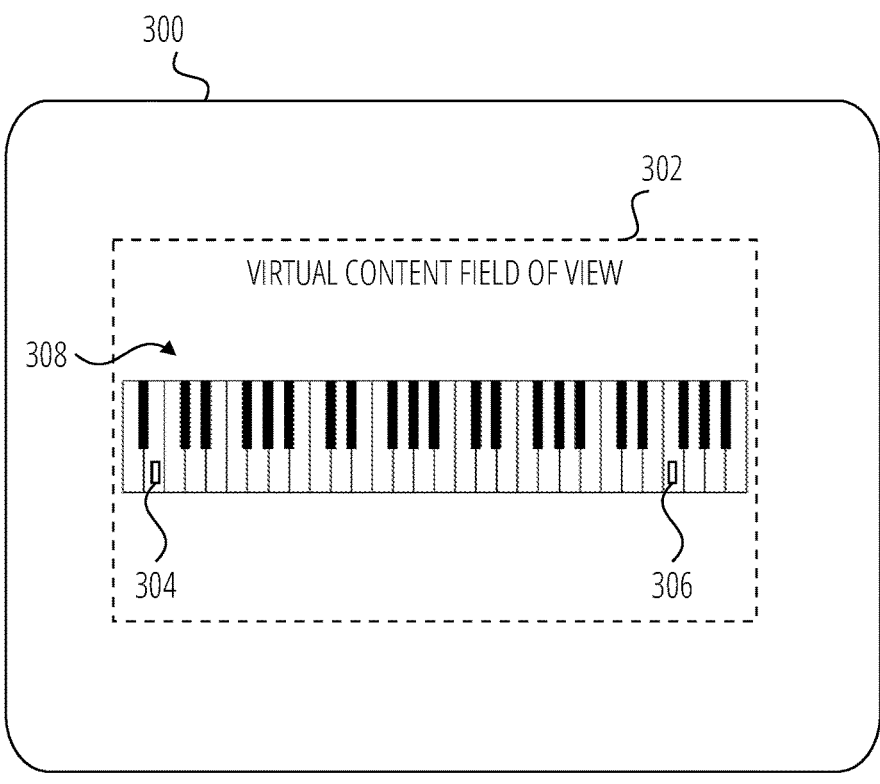
FIG. 3 is a diagrammatic illustration of a device field of view of an XR device, wherein a virtual content field of view within the device field of view is in a landscape mode, according to some examples.

Turning now to FIG. 3, a device field of view 300 of an XR device (e.g., the XR device 110 of FIG. 1 or FIG. 2) is shown. The device field of view 300 represents the extent of the observable environment that can be seen at any moment by the user of the XR device (e.g., a wearer of the XR device 110).

A virtual content field of view 302 is presented within the device field of view 300. The orientation and extent of the virtual content field of view 302 is determined by a display arrangement of the XR device that guides light from a display along an optical path. In the case of FIG. 3, the virtual content field of view 302 corresponds to a landscape mode. In other words, components of the display arrangement are positioned and/or configured such that virtual content can be presented within an area with a landscape orientation.

A landscape mode is useful for certain types of XR experiences. For example, and as shown in FIG. 3, virtual content 304, 306 can be presented to appear overlaid onto a real-world object 308 in the example form of a piano keyboard. The XR experience in FIG. 3 might, for example, be a virtual piano lesson where the virtual content 304, 306 is overlaid onto piano keys to help the user learn a new song or technique. The virtual content 304, 306 are merely examples. Virtual content overlaid onto the real-world object 308 can include, for example, notes, chords, or animated instructions that guide the user through piano playing techniques, enhancing the learning experience by providing real-time, context-sensitive information.

The landscape mode orientation allows for wide-angle augmentation of the piano keyboard (which is a relatively wide object), enabling the user to view all keys simultaneously. In some examples, the landscape mode is dynamically selected by the XR device 110 from multiple supported modes to allow the real-world object 308 to fit inside of the virtual content field of view 302. In other words, the wide field provided by the virtual content field of view 302 of FIG. 3 can prevent relevant real-world objects from being cut off from the augmentable area of the device field of view 300 during a user session (or reduce the risk of such cut-offs) or make it easier and more efficient for a developer to design a useful or interactive XR experience that benefits from a wide-angle view.

Using an adjustment mechanism as described herein (e.g., the adjustment mechanism 240), the XR device can switch to another display mode. For example, the adjustment mechanism can include a motorized mount that rotates parts of the display arrangement (e.g., rotates the display and lenses relative to an optical combiner), or a magnetic actuator that slides a reflecting mirror into the optical path to change the orientation of the virtual content field of view from the viewing perspective of the user.

Figure 4:
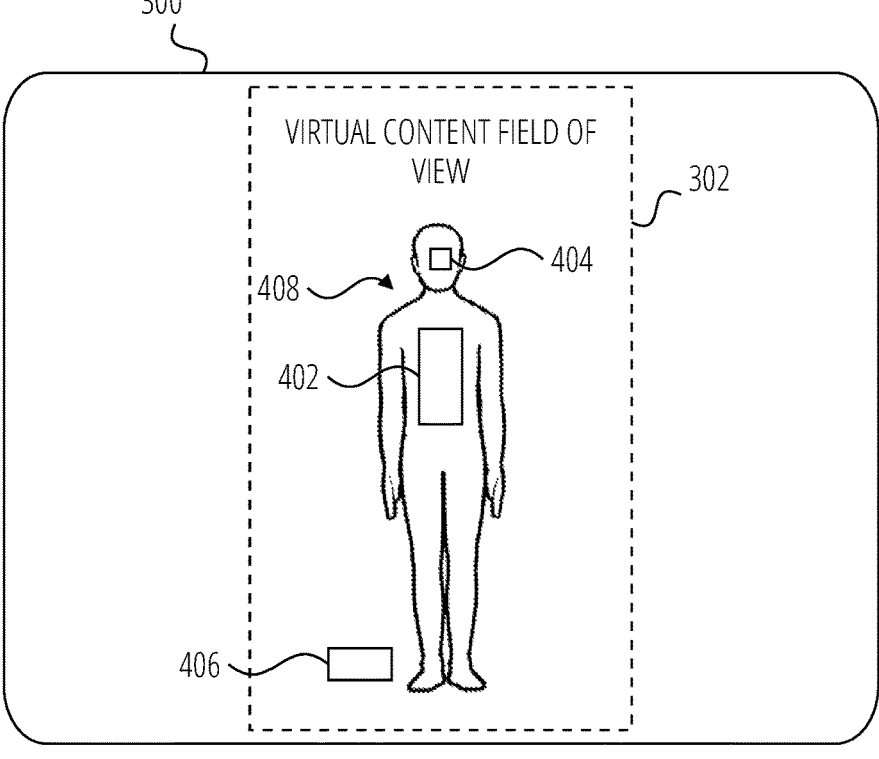
FIG. 4 is a diagrammatic illustration of the device field of view of FIG. 3, wherein the virtual content field of view is in a portrait mode, according to some examples.

FIG. 4 also shows the device field of view 300 with the virtual content field of view 302 therein. In FIG. 4, the virtual content field of view 302 is in an adjusted mode. Specifically, FIG. 4 illustrates a portrait mode. In other words, in FIG. 4, the virtual content field of view 302 has been adjusted so as to be vertically oriented.

Within the virtual content field of view 302 of FIG. 4, virtual content 402, 404, 406 is overlaid onto the real-world environment, which includes a real-world object 408 in the example form of a human body. The virtual content 402, 404, 406 might consist of items such as clothing or accessories, overlaid onto or next to the body of the user (e.g., being viewed in a mirror) or another person being viewed through the XR device. The virtual content 402, 404, 406 may be presented as part of an XR experience such as a virtual try-on application.

In this case, the portrait mode orientation of the virtual content field of view 302 is more suitable than the landscape mode orientation of FIG. 3. The taller field provided by the virtual content field of view 302 of FIG. 4 can prevent relevant real-world objects (such as the head or toes of the user) from being cut off from the augmentable area of the device field of view 300 during a user session or make it easier and more efficient to design an XR experience that benefits from such a taller field. This can allow the user to see more clearly or accurately, for example, how different apparel items would look on them without the need for physical fitting, thereby providing an interactive and convenient experience.

While examples herein primarily describe switching between portrait and landscape modes, it should be understood that these are merely illustrative examples of the capabilities of an adjustable display arrangement as described. The present disclosure is not limited to these two orientations; indeed, the adjustment mechanism can be designed to accommodate a wide range of display orientations and shapes to suit different content types or user preferences. For instance, a display could be adjusted to an oblique angle for certain gaming or artistic applications that benefit from a diagonal field of view from the viewing perspective of the user. Additionally or alternatively, an adjustment mechanism can enable a continuous rotation feature that allows for creation of dynamic and variable shapes, as described elsewhere herein. This versatility in adjusting the optical path to create various virtual content field of view aspect ratios and/or shapes significantly enhances the functionality of an XR device, making it an adaptable tool that supports a multitude of XR experiences.

Figure 5:
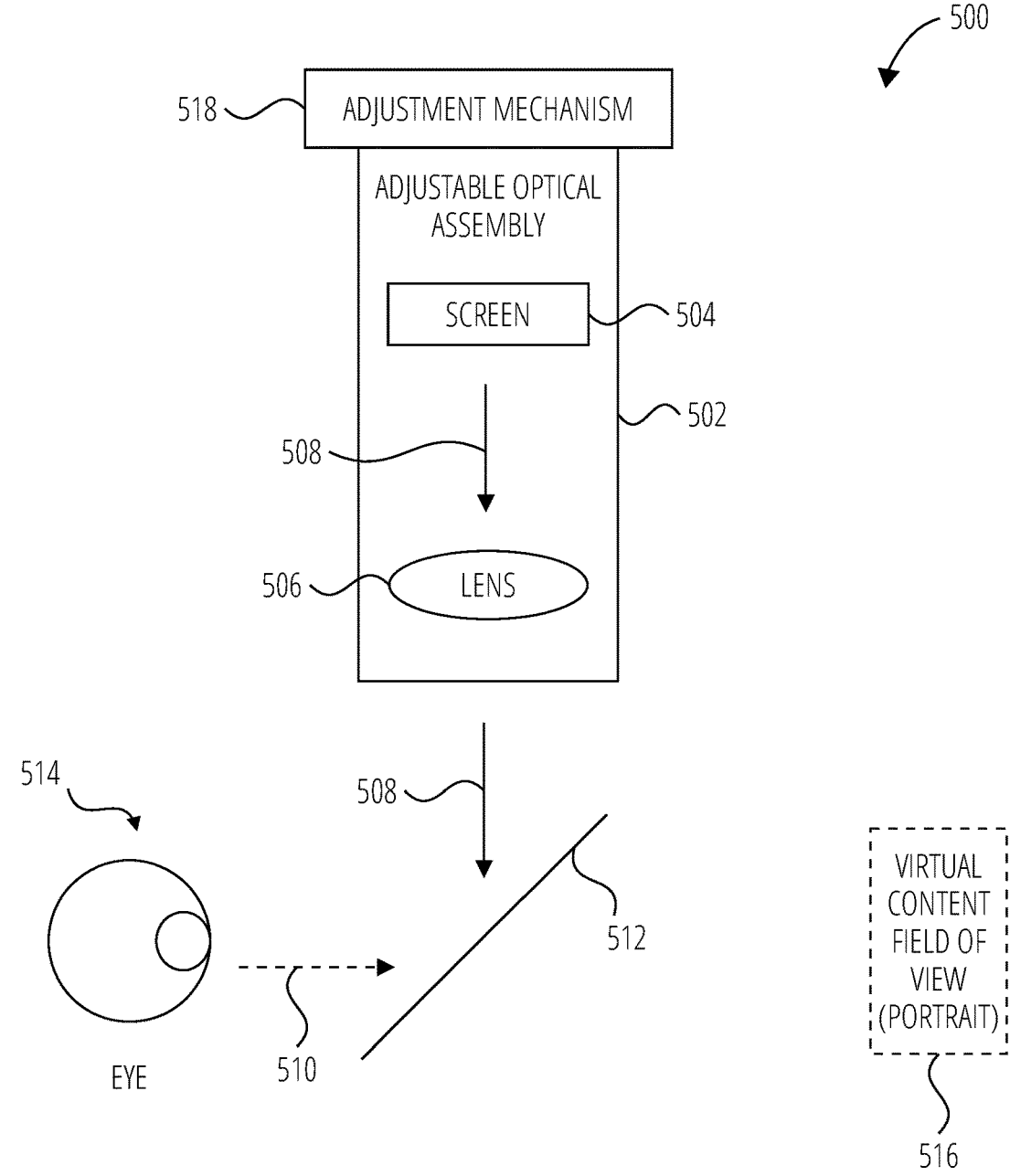
FIG. 5 is a diagrammatic side view illustration of a manner in which an adjustable optical assembly can be used to direct virtual content to be perceived in a virtual content field of view that is presented in a portrait mode, according to some examples.

Referring now to FIG. 5, a diagram 500 is shown to illustrate the manner in which an adjustable optical assembly 502 (as an example of the optical assembly 232 of FIG. 2) can be used to generate virtual content to be perceived in a virtual content field of view 516 that is presented in a portrait mode, according to some examples.

In FIG. 5, the adjustable optical assembly 502 includes a screen 504 (as an example of the display 234 of FIG. 2) and a focusing lens 506 (as an example of the focusing lens 236 of FIG. 2). It will be appreciated that FIG. 5 is not intended to provide an exhaustive indication of components of the adjustable optical assembly 502. For example, an optical assembly typically includes multiple lenses and/or other optical elements, and the single focusing lens 506 is shown and described to illustrate certain aspects of the present disclosure. For instance, in addition to a focusing lens, an optical assembly might include one or more further lenses for collimating light.

In the diagram 500 of FIG. 5, the adjustable optical assembly 502 is that of an OST display arrangement. The screen 504 is offset from a gaze path 510 of the user, as illustrated by the directional arrow indicating the gaze path 510, and the eye 514 shown in FIG. 5. In other words, the screen 504 is not directly in the view of the user when the user is wearing the XR device. Instead, the display arrangement includes a half-mirror 512 (as an example of an optical combiner) to direct light originating from the screen 504 into the gaze path 510 to enable the user to view both virtual content and features of a real-world environment.

From an optical perspective, the screen 504 is regarded as the origin point or zone for virtual content within the XR device, in some examples. The screen 504 is responsible for displaying images that will be superimposed onto or mixed into the user's view of the real-world environment. The adjustable optical assembly 502 is adjustable to enable the XR device to switch between different display modes.

As light from the screen 504 travels to the eye 514, it follows a particular optical path 508 that is based on a current configuration and/or position of the adjustable optical assembly 502. Positioned at an angle in the optical path 508, the half-mirror 512 reflects the light from the focusing lens 506 towards the user's eyes while simultaneously allowing light from the real-world environment to pass through. This dual-action enables the virtual content to be superimposed onto the user's view of the real environment.

As an example, the user can be using the AR application 224 of FIG. 2, causing the XR device to control the screen 504 to display virtual content within the virtual content field of view 516. For example, the user is using a virtual try-on application, a book reader application, or a social media feed, that is associated with or better suited to the portrait mode. This allows the XR device more "room" vertically to augment real-world objects or simply present virtual objects to the user.

To transition from portrait to landscape mode, the adjustable optical assembly 502 undergoes a physical rotation. For example, an adjustment mechanism 518 within the XR device (as an example of the adjustment mechanism 240 of FIG. 2) physically rotates the adjustable optical assembly 502 by 90 degrees relative to the half-mirror 512 and also relative to the head of the user. This rotation changes the orientation of the screen 504 and the focusing lens 506 relative to other XR device components and the head of the user, thereby altering the optical path 508 that the light travels along. It is noted that, in other examples, the adjustment mechanism 518 may rotate only the screen 504 relative to the other components.

Figure 6:
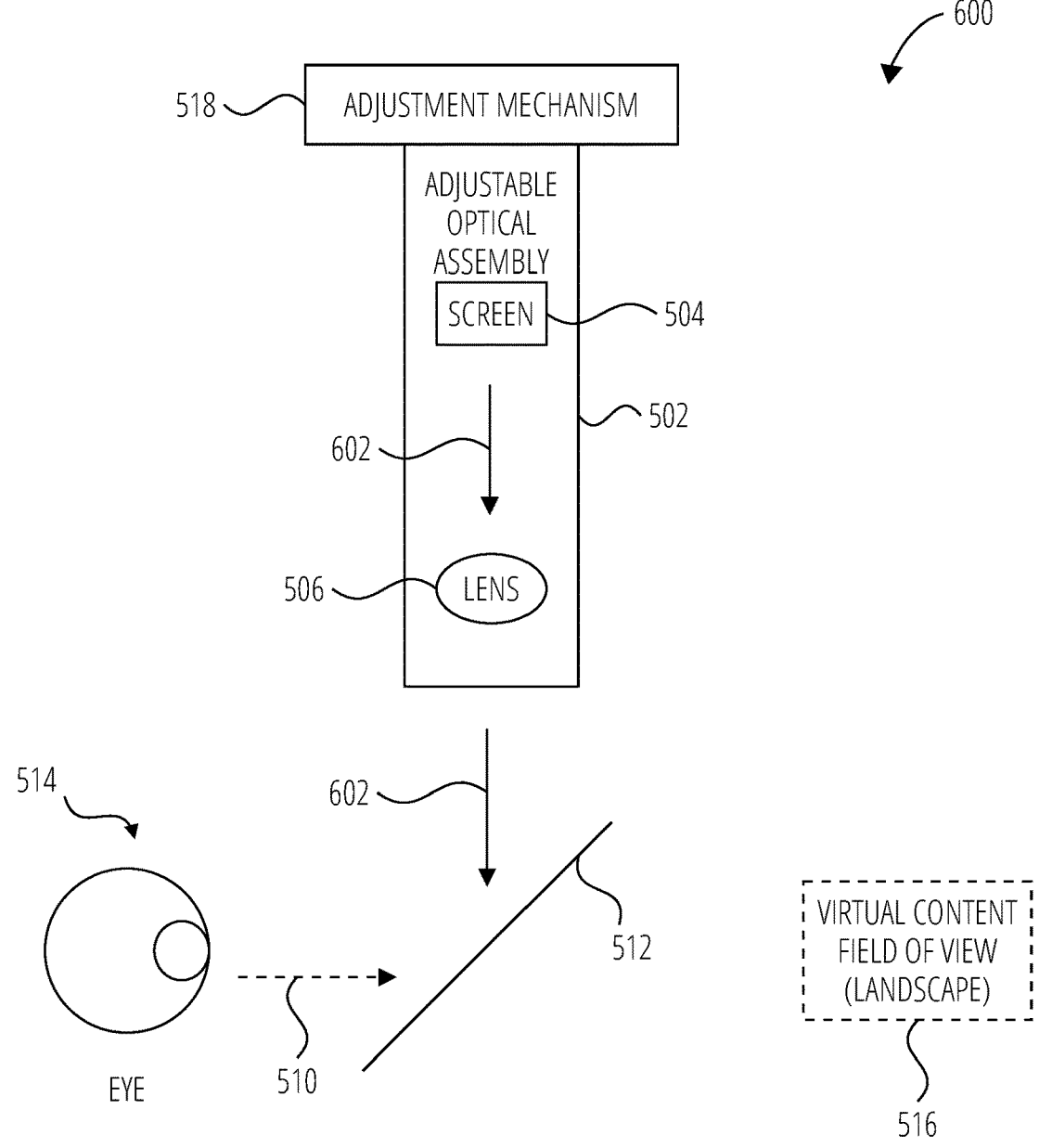
FIG. 6 is a diagrammatic side view illustration of a manner in which the adjustable optical assembly of FIG. 5 can be rotated to alter an optical path of the virtual content such that the virtual content is presented in a landscape mode, according to some examples.

FIG. 6 shows a diagram 600 of the components of FIG. 5, but in which the adjustable optical assembly 502 has been rotated as described. As a result, the virtual content field of view 516 is presented in a landscape orientation in FIG. 6. This wider virtual content field of view 516 is advantageous for applications that benefit from a horizontal layout, such as panoramic content viewing or interactive maps. The XR device thus has more room "vertically" to augment real-world objects or simply present virtual objects to the user.

In the example of FIG. 5 and FIG. 6, the half-mirror 512 remains stationary during this transition, positioned at an angle that continues to reflect the light from the now-rotated screen 504 into the gaze path 510 and towards the eye 514.

The light from the screen 504 thus travels along an altered optical path 602 to reach the half-mirror 512. The adjustment mechanism 518 responsible for rotating the optical assembly 502 ensures that the virtual content is correctly aligned with the user's gaze regardless of the display orientation, providing a seamless and intuitive user experience, and still providing high-quality images. It is noted that the half-mirror 512 is selected so as to be large enough to receive light from the screen 504 in both orientations of the adjustable optical assembly 502.

The adjustment mechanism 518 can be provided by different components, devices, or systems, such as a motorized mount that holds the entire adjustable optical assembly 502, including the screen 504 and focusing lens 506. This motorized mount might be configured for precise and controlled rotation, allowing the adjustable optical assembly 502 to switch between portrait and landscape orientations. For example, a stepper motor could be employed for its ability to move in exact increments, making it possible to achieve the desired orientation with high accuracy.

Another example of the adjustment mechanism 518 is a servo motor integrated with a feedback system, such as an encoder, to provide real-time data on the position or rotation of the adjustable optical assembly 502. This feedback allows the system to make immediate adjustments to maintain the correct orientation of the virtual content field of view.

As mentioned, the XR device can also adjust a rendering format to be applied to ensure that virtual content is correctly generated within the adjusted virtual content field of view 516.

Figure 7:
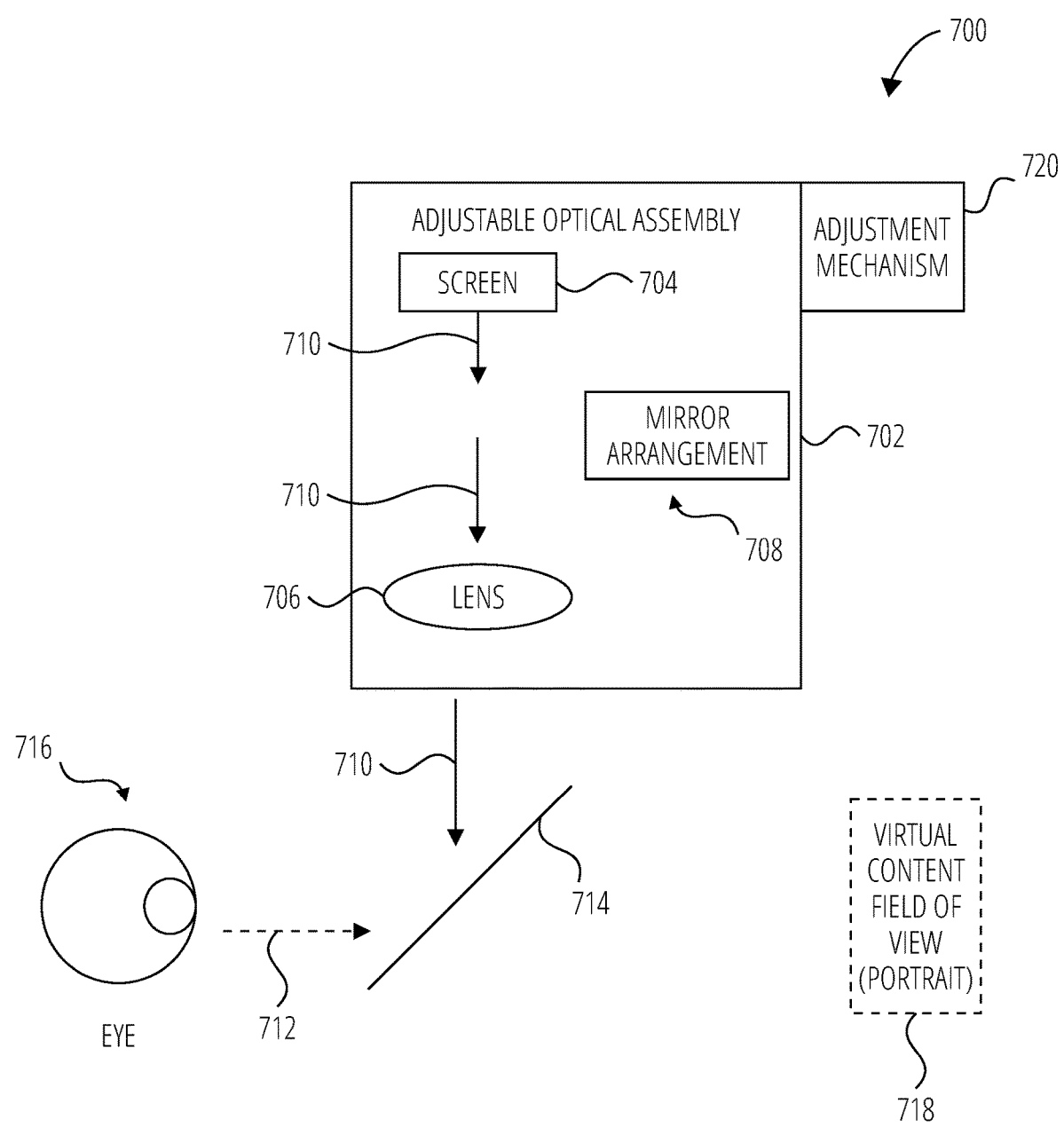
FIG. 7 is a diagrammatic side view illustration of a manner in which an adjustable optical assembly can be used to direct virtual content to be perceived in a virtual content field of view that is presented in a portrait mode, according to some examples.

Referring now to FIG. 7, a diagram 700 is shown to illustrate the manner in which an adjustable optical assembly 702 (as another example of the optical assembly 232 of FIG. 2) can be used to generate virtual content to be perceived in a virtual content field of view 718 that is presented in a portrait mode, according to some examples.

In FIG. 7, the adjustable optical assembly 702 includes a screen 704 (as an example of the display 234 of FIG. 2) and a focusing lens 706 (as an example of the focusing lens 236 of FIG. 2). The adjustable optical assembly 702 further includes a mirror arrangement 708 (as an example of the other optical components 238 of FIG. 2) with reflective mirrors that can, when positioned in the light path, guide light from the screen 704 to the focusing lens 706 in a predetermined manner. It will be appreciated that FIG. 7 is not intended to provide an exhaustive indication of components of the adjustable optical assembly 702. For instance, in addition to a focusing lens, an optical assembly might include one or more further lenses for collimating light.

In the diagram 700 of FIG. 7, the adjustable optical assembly 702 is that of an OST display arrangement. The screen 704 is offset from a gaze path 712 of the user, as illustrated by the directional arrow indicating the gaze path 712, and the eye 716 shown in FIG. 7. The display arrangement includes a half-mirror 714 (as an example of an optical combiner) to direct light originating from the screen 704 into the gaze path 712 to enable the user to view both virtual content and features of a real-world environment.

From an optical perspective, the screen 704 is regarded as the origin point or zone for virtual content within the XR device, in some examples. The screen 704 is responsible for displaying images that will be superimposed onto or mixed into the user's view of the real-world environment. The adjustable optical assembly 702 is adjustable to enable the XR device to switch between different display modes.

As light from the screen 704 travels to the eye 716, it follows a particular optical path 710 that is based on a current configuration and/or position of the adjustable optical assembly 702 or its elements. Positioned at an angle in the optical path 710, the half-mirror 714 reflects the light towards the user's eyes while simultaneously allowing light from the real-world environment to pass through.

In FIG. 7, to obtain the portrait mode configuration of the virtual content field of view 718, the light from the screen 704 does not pass through the mirror arrangement 708 in the adjustable optical assembly 702, and passes directly via the focusing lens 706, in such a manner that the light ultimately guided from the half-mirror 714 to the eye 716 corresponds to the portrait mode orientation. In other words, the mirror arrangement 708 is not in the optical path 710. As an example, the user can be using the AR application 224 of FIG. 2, causing the XR device to control the screen 704 to display virtual content within the virtual content field of view 718. For example, the user is using the virtual try-on application, the book reader application, or the social media feed, as described above.

Figure 8:
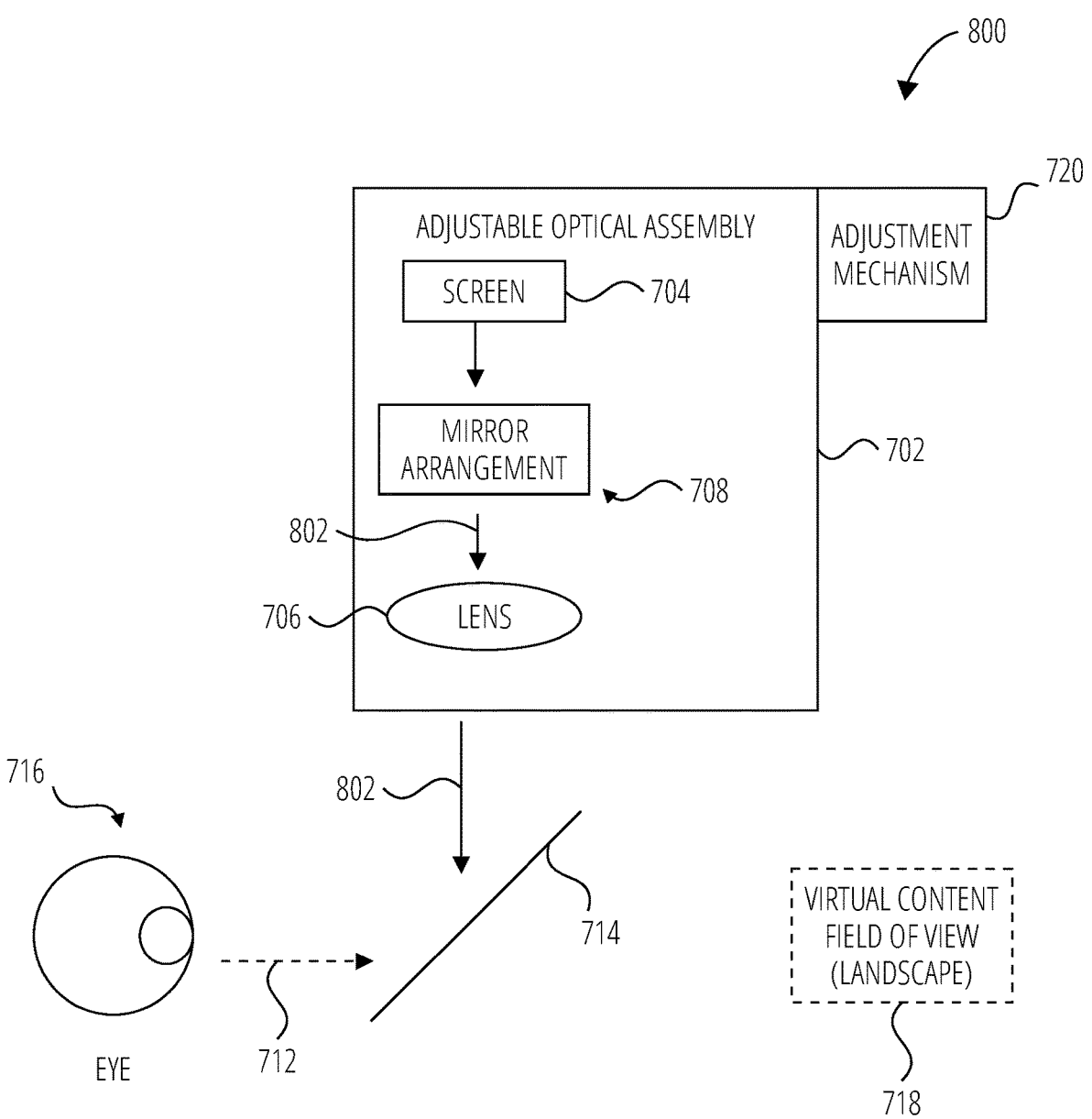
FIG. 8 is a diagrammatic side view illustration of a manner in which the adjustable optical assembly of FIG. 7 can be adjusted to alter an optical path of the virtual content such that the virtual content is presented in a landscape mode, according to some examples.

To transition from portrait to landscape mode, the adjustable optical assembly 702 is adjusted by an adjustment mechanism 720. Instead of rotating the optical assembly, as is the case in the example of FIG. 5 and FIG. 6, the adjustment mechanism 720 introduces the mirror arrangement 708 into the optical path, as shown in the diagram 800 of FIG. 8. When the adjustment mechanism 720 positions the mirror arrangement 708 into the optical path, it causes the optical path to be altered (see the altered optical path 802 of FIG. 8) to provide a landscape mode of the virtual content field of view 718 without the need for physically rotating the entire adjustable optical assembly 702. For example, the mirror arrangement 708 can include at least two reflective mirrors that are positioned at predetermined angles relative to the screen 704 (e.g., at least a pair of 45 degree mirrors) and relative to each other, thereby essentially rotating virtual content originating at the screen 704 by while it travels along the altered optical path. The content can be rotated by 90 degrees compared to its orientation when the mirror arrangement 708 is not in the optical path. Those skilled in the art will appreciate that various mirror-based arrangements, arrangements including mirrors and lenses, can be used to obtain such a rotation.

The user wearing the XR device can then have an XR experience with the virtual content field of view 718 in the landscape mode (e.g., to view wide-angle virtual content). To switch back to the portrait mode, the adjustment mechanism 720 can displace the mirror arrangement 708 out of the optical path. The adjustment mechanism 720, by manipulating the position of the mirror arrangement 708, provides a versatile solution for dynamically changing the display area's orientation (from the user's perspective) to suit different content types and user preferences. It is noted that the half-mirror 714 is selected so as to be large enough to receive light from the screen 704 in both cases (where the mirror arrangement 708 is inserted and where the mirror arrangement 708 is removed).

The adjustment mechanism 720 can, for example, be a linear actuator that slides one or more optical elements into or out of the optical path or a piezoelectric actuator that manipulates the positions of one or more optical elements. For instance, the linear actuator can be controlled by a processor of the XR device (e.g., a processor running the display mode system 226), receiving instructions to alter the optical path, thereby allowing the XR device to dynamically switch between display modes.

Figure 9:
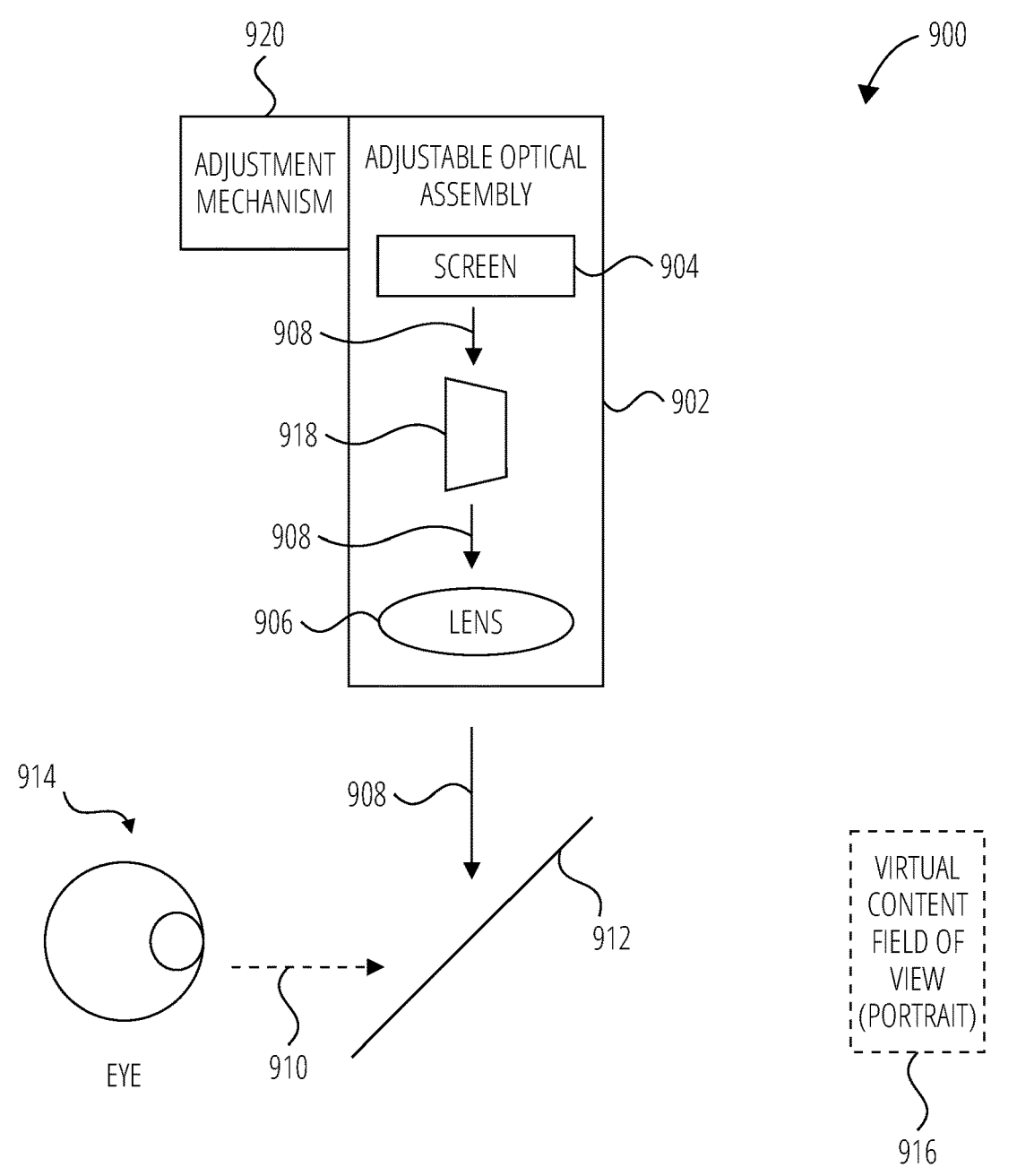
FIG. 9 is a diagrammatic side view illustration of a manner in which an adjustable optical assembly can be used to direct virtual content to be perceived in a virtual content field of view that is presented in a portrait mode, according to some examples.

Turning to FIG. 9, a diagram 900 is shown to illustrate the manner in which an adjustable optical assembly 902 (as another example of the optical assembly 232 of FIG. 2) can be used to generate virtual content to be perceived in a virtual content field of view 916 that is presented in a portrait mode, according to some examples.

In FIG. 9, the adjustable optical assembly 902 includes a screen 904 (as an example of the display 234 of FIG. 2) and a focusing lens 906 (as an example of the focusing lens 236 of FIG. 2). The adjustable optical assembly 902 further includes a dove prism 918 (as an example of the other optical components 238 of FIG. 2) that guides light from the screen 904 to the focusing lens 906 in a certain manner. It will be appreciated that FIG. 9 is not intended to provide an exhaustive indication of components of the adjustable optical assembly 902. For instance, in addition to a focusing lens, an optical assembly might include one or more further lenses for collimating light.

In the diagram 900 of FIG. 9, the adjustable optical assembly 902 is that of an OST display arrangement. The screen 904 is offset from a gaze path 910 of the user, as illustrated by the directional arrow indicating the gaze path 910, and the eye 914 shown in FIG. 9. The display arrangement includes a half-mirror 912 (as an example of an optical combiner) to direct light originating from the screen 904 into the gaze path 910 to enable the user to view both virtual content and features of a real-world environment.

The screen 904 is responsible for displaying images that will be superimposed onto or mixed into the user's view of the real-world environment. The adjustable optical assembly 902 is adjustable to enable the XR device to switch between different display modes.

As light from the screen 904 travels to the eye 914, it follows a particular optical path 908 that is based on a current configuration and/or position of the adjustable optical assembly 902 or its elements. Positioned at an angle in the optical path 908, the half-mirror 912 reflects the light towards the user's eyes while simultaneously allowing light from the real-world environment to pass through.

In FIG. 9, to obtain the portrait mode configuration of the virtual content field of view 916, the dove prism 918 is positioned in a first rotational position (about its own longitudinal axis). Light from the screen 904 passes through the dove prism 918 in the adjustable optical assembly 902 and is inverted by 180 degrees, and then passes via the focusing lens 906. In this way, the light ultimately guided from the half-mirror 912 to the eye 914 corresponds to the portrait mode orientation. The user can then use the XR device with the virtual content field of view 916 in this orientation, as described elsewhere.

To transition from portrait to landscape mode, the adjustable optical assembly 902 is adjusted by an adjustment mechanism 920. Instead of rotating the entire optical assembly, as is the case in the example of FIG. 5 and FIG. 6, and instead of moving an optical element or elements into or out of the optical path, as is the case in the example of FIG. 7 and FIG. 8, the dove prism 918 is rotated by the adjustment mechanism 920.

Figure 10:
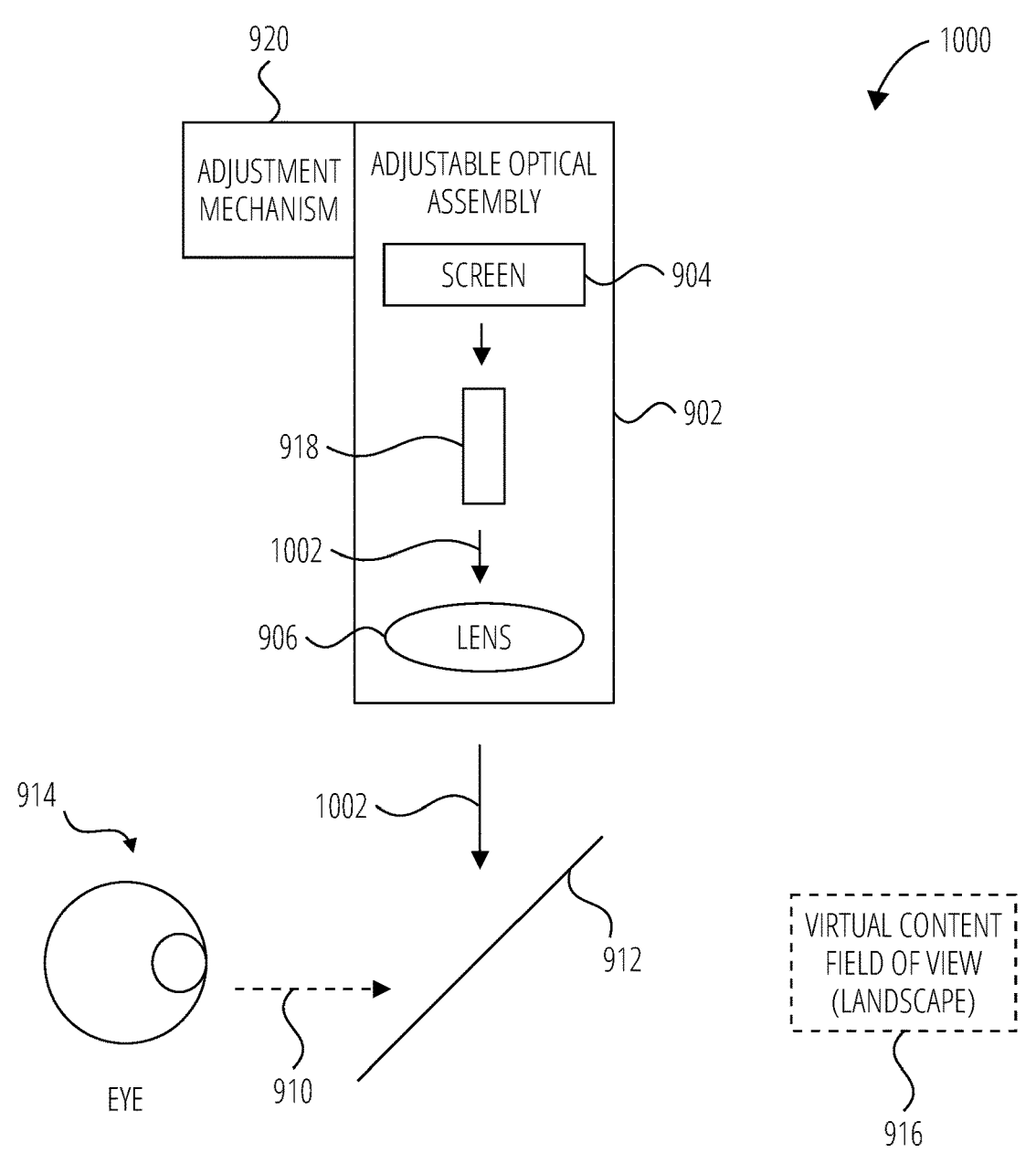
FIG. 10 is a diagrammatic side view illustration of a manner in which the adjustable optical assembly of FIG. 9 can be adjusted to alter an optical path of the virtual content such that the virtual content is presented in a landscape mode, according to some examples.

The dove prism 918 has the property of rotating an image around the axis of the optical path. If the dove prism 918 is rotated, virtual content perceived by the user is rotated by twice the angle of the rotation of the dove prism 918. The dove prism 918 may thus be rotated by 45 degrees, altering the optical path (see the altered optical path 1002 in FIG. 10) to obtain a 90 degree rotation in the virtual content field of view 916, thereby switching it to landscape mode as shown in the diagram 1000 of FIG. 10.

The adjustment mechanism 920, by manipulating the rotational position of the dove prism 918 about its own longitudinal axis, allows for control over the orientation of the virtual content without the need for physically rotating the entire adjustable optical assembly 902 or displacing elements into or out of the optical path.

The half-mirror 912 remains in a fixed position during this transition, continuing to reflect the now-rotated light from the dove prism 918 into the gaze path 910 and towards the eye 914. This ensures that the virtual content in the virtual content field of view 916 is correctly aligned with the user's view, providing an immersive and consistent experience regardless of the content orientation. It is again noted that the half-mirror 912 is selected so as to be large enough to receive light from the screen 904 irrespective of the rotational position of the dove prism 918.

Different types of mechanisms can be used in the adjustment mechanism 920. For example, the adjustment mechanism 920 can be a rotary actuator (e.g., using a rotary solenoid) that directly turns the dove prism 918 around its longitudinal axis. Alternatively, the adjustment mechanism 920 could utilize a magnetic system with magnets and corresponding electromagnets. By altering current through the electromagnets, the magnetic field can be manipulated to rotate the dove prism 918. The adjustment mechanism 920 can communicate with a display mode system (e.g., the display mode system 226) to receive instructions and provide feedback as to rotational position.

In some examples, instead of switching between discrete display modes for periods of time (e.g., switching to a portrait mode when using a first application, and then switching to a landscape mode when using a second application), a display arrangement continuously cycles through modes. For example, continuous rotation of the adjustable optical assembly 502 of FIG. 5 or continuous rotation of the dove prism 918 of FIG. 9 can be performed to enable variable shapes of the virtual content field of view. The display arrangement thus, at least for a period of time, continuously progresses through a series of modes as one or more of its components rotate.

This allows for dynamic and continuous adjustment of the virtual content field of view, providing users with a customizable visual experience that can adapt in real-time to the content being displayed or the specific application in use. For example, the display arrangement (e.g., the display arrangement 206 of FIG. 2) can include a high frame rate display paired with a precision motorized mechanism that can control the rotation of optical elements, such as prisms, within the optical assembly. The motorized system can be designed to rotate these elements at variable speeds, which can be finely tuned to match the requirements of different applications.

In some examples, as the optical elements rotate with the display presenting virtual content, the virtual content field of view changes, potentially creating various shapes such as circular or elliptical fields of view. This dynamic virtual content field of view allows the XR device (e.g., the XR device 110) to adapt to better match the content being displayed, enhancing the user's immersion and interaction with the XR environment. A continuous rotation arrangement may offer a level of flexibility that goes beyond traditional landscape or portrait modes.

In some examples, a synchronization system is used to render virtual content for a continuously rotating display arrangement to ensure that the virtual content is accurately aligned and timed with the rotating optical elements. A rendering engine of the XR device (e.g., the XR device 110) can be configured to account for changing orientation and/or shape of the virtual content field of view, adjusting the virtual content in real-time based on information as to the current and/or future position of rotating elements. This can involve predicting the position of rotating elements and adjusting the rendering parameters accordingly, such as increasing brightness or contrast in certain areas to compensate for varying exposure times.

For example, as a display rotates, central areas receive light from every frame, while outer areas receive less light. To address this, the rendering process is designed to balance the colors and brightness to maintain a consistent image. In some examples, the XR device implements a rendering pipeline capable of adjusting parameters in real-time to account for the aspect ratio and orientation changes. The XR device can also receive feedback from an adjustment mechanism regarding current rotational position. This allows the XR device to render the appropriate frame, which can be achieved through a low persistence mode. This mode ensures that as a component rotates, the pixels that are, for example, supposed to go upwards are rendered at the correct time and in the correct place, minimizing blur and maintaining image clarity.

Accordingly, in some examples, by tracking the orientation of the resulting image, the XR device automatically determines which pixels need to be illuminated and/or how pixels need to be illuminated. For example, if a pixel for the given rotation would fall outside the desired shape, it displays a black color, thus not adding any content at that location. In some examples, fast rotation would be implemented by the XR device to make such changes imperceptible or near-imperceptible. The XR device may decompose a final image into contributing images for different angles to determine which color should be displayed, thereby ensuring that the perceived image matches the desired image.

As an example, to display virtual content in an area with a shape of a cross, the XR device 110 can dynamically switch between portrait and landscape mode. The XR device determines that certain areas will be visible (e.g., will be part of the virtual content field of view) only at landscape orientations, while other areas will only be visible at portrait orientations, while central areas will be visible in all orientations. The XR device may thus render and display content accordingly to ensure that the user sees the desired images. For example, the XR device can decompose a virtual image into a composition of colors to be shown for respective modes or orientations.

FIG. 11 is a flowchart illustrating a method 1100 suitable for adjusting an XR device from a first display mode to a second display mode, according to some examples. The method 1100 can be performed by an XR device, such as the XR device 110 of FIG. 1, that has an optical assembly, such as the optical assembly 232 of FIG. 2. Devices and components of FIG. 1 and FIG. 2, as well as aspects depicted in FIG. 3 and FIG. 4, are referred to below as non-limiting examples to illustrate aspects of the method 1100.

The method 1100 commences at opening loop element 1102 and proceeds to operation 1104, where the XR device 110 commences a user session. For example, the user 106 starts using the XR device 110 (e.g., puts on a head-wearable device and turns it on), and then launches a first AR application to start an AR experience. In one example, the first AR application provides a piano training experience as depicted in FIG. 3.

Upon launching of the first AR application, the display mode system 226 checks application data of the first AR application (e.g., in the application data 244) and determines that the first AR application is recommended for presentation in a landscape mode. The display mode system 226 thus selects a first display mode as the landscape mode at operation 1106. If needed (e.g., if the display arrangement 206 is not positioned or configured for the first display mode), the display mode system 226 instructs the adjustment mechanism 240 to adjust the display arrangement 206 such that, once the first AR application starts presenting virtual content, the virtual content field of view 302 will correspond to the landscape mode. Alternatively, the display mode system 226 detects that the display arrangement 206 is already correctly positioned or configured for the landscape mode.

At operation 1108, the XR device 110 presents virtual content in the virtual content field of view 302 in the first display mode (landscape mode). For example, and referring back to FIG. 3, the XR device 110 presents the virtual content 304, 306 as overlaid onto the real-world object 308 to provide the piano training experience.

The method 1100 proceeds to operation 1110, where the XR device 110 detects a mode adjustment trigger. In the method 1100, the mode adjustment trigger is that another application in the example form of a second AR application has been launched, and the other application is associated with a different display mode than the current display mode of the XR device 110. In one example, the second AR application provides a virtual try-on experience as depicted in FIG. 4. The XR device 110 processes application data of the second AR application (e.g., in the application data 244) and determines that the second AR application is recommended for presentation in a portrait mode. Thus, the display mode system 226 selects the portrait mode as a second display mode at operation 1112.

It is noted that the launching of an application that is associated with a different display mode is merely a non-limiting example of a mode adjustment trigger. Various other mode adjustment triggers may be used or supported by the display mode system 226. For example, the display mode system 226 can check a content type of virtual content to be presented to the user, and determine that a mode adjustment is needed based on a change in content type. For example, within a single application, vertically oriented content can be presented at a first point in time, while horizontally oriented content is presented at a second point in time. The display mode system 226 can cause the display arrangement 206 to change the virtual content field of view from the portrait mode to the landscape mode such that the horizontally oriented content can be more effectively displayed in a landscape mode at the second point in time, thereby better utilizing available space within the device field of view 300.

In some examples, user input is regarded a mode adjustment trigger. For example, the user of the XR device 110 can press a button on the XR device 110, or perform a predetermined gesture, to command the XR device 110 to adjust the display arrangement 206 such that the virtual content field of view changes. The user can, for instance, use their hand to select a virtual button indicating "switch to landscape mode." The XR device 110 receives a mode adjustment trigger as a result of this selection, and adjusts the display arrangement 206 accordingly.

Referring again to the method 1100 of FIG. 11, after selecting the portrait mode as the second display mode, at operation 1114, the display mode system 226 instructs the adjustment mechanism 240 to adjust the display arrangement 206. For example, the optical assembly 232, or part thereof, is rotated or displaced, as described in other examples in the present disclosure, to alter the optical path via which virtual content is directed to the eyes of the user from the display 234. In this way, the XR device 110 switches from the first display mode to the second display mode during the same user session.

At operation 1116, the XR device 110 presents virtual content in the virtual content field of view 302 in the second display mode (portrait mode). For example, and referring back to FIG. 4, the XR device 110 presents the virtual content 402, 404, 406 as overlaid onto the real-world object 408 to provide the virtual try-on experience. As mentioned, the XR device 110 may switch back and forth between the display modes based on mode adjustment triggers. As also mentioned, the XR device 110 may support more than two modes, with the landscape mode and the portrait mode merely being two examples that are used to illustrate certain aspects of the present disclosure. The method concludes at closing loop element 1118 (e.g., when the user ends the user session).

FIG. 12 illustrates a network environment 1200 in which a head-wearable apparatus 1202, such as a head-wearable XR device, can be implemented according to some examples. FIG. 12 provides a high-level functional block diagram of an example head-wearable apparatus 1202 communicatively coupled a user device 1238 and a server system 1232 via a suitable network 1240. One or more of the techniques described herein may be performed using the head-wearable apparatus 1202 or a network of devices similar to those shown in FIG. 12. In some examples, a display arrangement as described herein is integrated into the head-wearable apparatus 1202 to provide the ability to switch between different display modes.

The head-wearable apparatus 1202 includes a camera, such as at least one of a visible light camera 1212 and an infrared camera and emitter 1214. The head-wearable apparatus 1202 includes other sensors 1216, such as motion sensors or eye tracking sensors. The user device 1238 can be capable of connecting with head-wearable apparatus 1202 using both a communication link 1234 and a communication link 1236. The user device 1238 is connected to the server system 1232 via the network 1240. The network 1240 may include any combination of wired and wireless connections.

The head-wearable apparatus 1202 includes a display arrangement that has several components. For example, the arrangement includes two image displays 1204 of an optical assembly 1242. The two displays may include one associated with the left lateral side and one associated with the right lateral side of the head-wearable apparatus 1202. The head-wearable apparatus 1202 also includes an image display driver 1208, an image processor 1210, low power circuitry 1226, and high-speed circuitry 1218. The image displays 1204 are for presenting images and videos, including an image that can provide a graphical user interface to a user of the head-wearable apparatus 1202.

The image display driver 1208 commands and controls the image display of each of the image displays 1204. The image display driver 1208 may deliver image data directly to each image display of the image displays 1204 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The images and videos (e.g., virtual content) may be presented to a user by directed light from the image displays

1204 along respective optical paths to the eyes of the user. The head-wearable apparatus 1202 may use the optical assembly 1242 to guide, direct, manipulate, and/or focus light to the eyes of the user. The optical assembly 1242 may include or be connected to one or more adjustment mechanisms, as described in the present disclosure, to enable the head-wearable apparatus 1202 to present images and video so as to be perceived in different modes of a virtual content field of view.

The head-wearable apparatus 1202 may include a frame and stems (or temples) extending from a lateral side of the frame, or another component (e.g., a head strap) to facilitate wearing of the head-wearable apparatus 1202 by a user. The head-wearable apparatus 1202 of FIG. 12 further includes a user input device 1206 (e.g., touch sensor or push button) including an input surface on the head-wearable apparatus 1202. The user input device 1206 is configured to receive, from the user, an input selection to manipulate virtual content, such as the graphical user interface of the presented image.

At least some components shown in FIG. 12 for the head-wearable apparatus 1202 are located on one or more circuit boards, for example a printed circuit board (PCB) or flexible PCB, in the head-wearable apparatus 1202. Depicted components can be located in frames, chunks, hinges, or bridges of the head-wearable apparatus 1202, for example. Left and right sides of the head-wearable apparatus 1202 may each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1202 includes a memory 1222 which stores instructions to perform a subset or all of the functions described herein. The memory 1222 can also include a storage device. As further shown in FIG. 12, the high-speed circuitry 1218 includes a high-speed processor 1220, the memory 1222, and high-speed wireless circuitry 1224. In FIG. 12, the image display driver 1208 is coupled to the high-speed circuitry 1218 and operated by the high-speed processor 1220 in order to drive the left and right image displays of the image displays 1204. The high-speed processor 1220 may be any processor capable of managing high-speed communications and operation of any general computing system needed for the head-wearable apparatus 1202. The high-speed processor 1220 includes processing resources needed for managing high-speed data transfers over the communication link 1236 to a wireless local area network (WLAN) using high-speed wireless circuitry 1224. In certain examples, the high-speed processor 1220 executes an operating system such as a LINUX operating system or other such operating system of the head-wearable apparatus 1202 and the operating system is stored in memory 1222 for execution. In addition to any other responsibilities, the high-speed processor 1220 executing a software architecture for the head-wearable apparatus 1202 is used to manage data transfers with high-speed wireless circuitry 1224. In certain examples, high-speed wireless circuitry 1224 is configured to implement Institute of Electrical and Electronic Engineers (IEEE) 1202.11 communication standards, also referred to herein as Wi-Fi™. In other examples, other high-speed communications standards may be implemented by high-speed wireless circuitry 1224.

The low power wireless circuitry 1230 and the high-speed wireless circuitry 1224 of the head-wearable apparatus 1202 can include short range transceivers (Bluetooth™) and wireless wide, local, or wide area network transceivers (e.g., cellular or Wi-Fi™). The user device 1238, including the transceivers communicating via the communication link 1234 and communication link 1236, may be implemented using details of the architecture of the head-wearable apparatus 1202, as can other elements of the network 1240.

The memory 1222 may include any storage device capable of storing various data and applications, including, among other things, camera data generated by the visible light camera 1212, sensors 1216, and the image processor 1210, as well as images generated for display by the image display driver 1208 on the image displays of the image displays 1204. While the memory 1222 is shown as integrated with the high-speed circuitry 1218, in other examples, the memory 1222 may be an independent standalone element of the head-wearable apparatus 1202. In certain such examples, electrical routing lines may provide a connection through a chip that includes the high-speed processor 1220 from the image processor 1210 or low power processor 1228 to the memory 1222. In other examples, the high-speed processor 1220 may manage addressing of memory 1222 such that the low power processor 1228 will boot the high-speed processor 1220 any time that a read or write operation involving memory 1222 is needed.

As shown in FIG. 12, the low power processor 1228 or high-speed processor 1220 of the head-wearable apparatus 1202 can be coupled to the camera (visible light camera 1212, or infrared camera and emitter 1214), the image display driver 1208, the user input device 1206 (e.g., touch sensor or push button), and the memory 1222. The head-wearable apparatus 1202 also includes sensors 1216, which may be the motion components 1434, position components 1438, environmental components 1436, and biometric components 1432, e.g., as described below with reference to FIG. 14. In particular, motion components 1434 and position components 1438 are used by the head-wearable apparatus 1202 to determine and keep track of the position and orientation (the "pose") of the head-wearable apparatus 1202 relative to a frame of reference or another object, in conjunction with a video feed from one of the visible light cameras 1212, using for example techniques such as structure from motion (SfM) or VIO.

In some examples, and as shown in FIG. 12, the head-wearable apparatus 1202 is connected with a host computer. For example, the head-wearable apparatus 1202 is paired with the user device 1238 via the communication link 1236 or connected to the server system 1232 via the network 1240. The server system 1232 may be one or more computing devices as part of a service or network computing system, for example, that include a processor, a memory, and network communication interface to communicate over the network 1240 with the user device 1238 and head-wearable apparatus 1202.

The user device 1238 includes a processor and a network communication interface coupled to the processor. The network communication interface allows for communication over the network 1240, communication link 1234 or communication link 1236. The user device 1238 can further store at least portions of the instructions for implementing functionality described herein.

Output components of the head-wearable apparatus 1202 include visual components, such as a display (e.g., one or more liquid-crystal display (LCD)), one or more plasma display panel (PDP), one or more light emitting diode (LED) display, one or more projector, or one or more waveguide. The image displays 1204 described above are examples of such a display. In some examples, the image displays 1204 of the optical assembly 1242 are driven by the image display driver 1208.

The output components of the head-wearable apparatus 1202 may further include acoustic components (e.g., speakers), haptic components (e.g., a vibratory motor), other signal generators, and so forth. The input components of the head-wearable apparatus 1202, the user device 1238, and server system 1232, such as the user input device 1206, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1202 may optionally include additional peripheral device elements. Such peripheral device elements may include biometric sensors, additional sensors, or display elements integrated with the head-wearable apparatus 1202. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1236 from the user device 1238 via the low power wireless circuitry 1230 or high-speed wireless circuitry 1224.

FIG. 13 is a block diagram 1300 illustrating a software architecture 1304, which can be installed on one or more of the devices described herein, according to some examples. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350, through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, Bluetooth™ or Bluetooth™ Low Energy drivers, flash memory drivers, serial communication drivers (e.g., Universal Serial Bus (USB) drivers), Wi-Fi™ drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In some examples, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. In some examples, the applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In some examples, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 13, the third-party application 1340 can invoke the API calls 1350 provided by the operating system 1312 to facilitate functionality described herein. The applications 1306 may include an AR application such as the AR application 224 described herein, according to some examples.

FIG. 14 is a diagrammatic representation of a machine 1400 within which instructions 1408 (e.g., software, a program, an application, an applet, an app, or other executable code) for causing the machine 1400 to perform any one or more of the methodologies discussed herein may be executed, according to some examples. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines.

In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may be configured to communicate with each other via a bus 1444. In some examples, the processors 1402 may include, for example, a processor 1406 and a processor 1410 that execute the instructions 1408. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, accessible to the processors via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors, or any suitable combination thereof, during execution thereof by the machine 1400.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various examples, the I/O components 1442 may include output components 1428 and input components 1430. The output components 1428 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface component or another suitable device to interface with the network 1420. In further examples, the communication components 1440 may include wired communication components, wireless communication components, cellular communication components, Near Field Communication (NFC) components, Bluetooth™ components, Wi-Fi™ components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi™ signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed examples.

The instructions 1408 may be transmitted or received over the network 1420, using a transmission medium, via a network interface device (e.g., a network interface component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, in the present disclosure, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, inventive subject matter may reside in less than all features of a single disclosed example.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a head-wearable XR device that includes a display arrangement, the display arrangement comprising: a display to display virtual content; one or more optical elements to direct the virtual content along an optical path to an eye of a user of the XR device, the virtual content being presented in a virtual content field of view; and an adjustment mechanism to alter the optical path so as to adjust the virtual content field of view between at least two display modes.

In Example 2, the subject matter of Example 1 includes, wherein the adjustment of the virtual content field of view comprises adjustment of an aspect ratio of the virtual content field of view from a viewing perspective of the user.

In Example 3, the subject matter of any of Examples 1-2 includes, wherein the at least two display modes comprise a portrait mode and a landscape mode.

In Example 4, the subject matter of any of Examples 1-3 includes, wherein the adjustment mechanism is to alter the optical path by adjusting at least one of the display or the one or more optical elements.

In Example 5, the subject matter of Example 4 includes, wherein the adjustment mechanism is to alter the optical path by causing rotation of at least one of the display or the one or more optical elements.

In Example 6, the subject matter of any of Examples 4-5 includes, wherein the adjustment mechanism is to alter the optical path by causing displacement of at least a subset of the one or more optical elements into or out of the optical path.

In Example 7, the subject matter of any of Examples 1-6 includes, wherein the XR device comprises an optical assembly that includes the display and the one or more optical elements, and the adjustment mechanism is to alter the optical path by causing rotation of the optical assembly.

In Example 8, the subject matter of any of Examples 1-7 includes, wherein the one or more optical elements comprise at least one of a focusing lens, prism, or a mirror.

In Example 9, the subject matter of any of Examples 1-8 includes, wherein the XR device further comprises: at least one processor; and a memory storing instructions that, when executed by the at least one processor, configure the XR device to perform operations comprising: detecting a mode adjustment trigger; and in response to detecting the mode adjustment trigger, causing the adjustment mechanism to adjust the virtual content field of view from a first display mode of the at least two display modes to a second display mode of the at least two display modes.

In Example 10, the subject matter of Example 9 includes, wherein the first display mode is one of a portrait mode or a landscape mode and the second display mode is the other one of the portrait mode or the landscape mode.

In Example 11, the subject matter of any of Examples 9-10 includes, wherein the mode adjustment trigger is detected based on a content type of the virtual content.

In Example 12, the subject matter of any of Examples 9-11 includes, wherein the mode adjustment trigger is detected based on application data of an XR application executing at the XR device.

In Example 13, the subject matter of Example 12 includes, wherein the detection of the mode adjustment trigger comprises: detecting launching of the XR application; and processing the application data to identify that the XR application is associated with the second display mode.

In Example 14, the subject matter of any of Examples 9-13 includes, wherein the mode adjustment trigger is detected based on user input received from the user of the XR device during a user session, and the operations comprise switching from the first display mode to the second display mode during the user session.

In Example 15, the subject matter of any of Examples 9-14 includes, wherein the operations further comprise: adjusting a rendering format of the virtual content to synchronize the virtual content with the second display mode of the virtual content field of view.

In Example 16, the subject matter of any of Examples 1-15 includes, wherein the virtual content comprises a virtual object, and the XR device further comprises: at least one processor; and a memory storing instructions that, when executed by the at least one processor, configure the XR device to perform operations comprising: identifying a display mode from among the at least two display modes; causing the adjustment mechanism to adjust the virtual content field of view to correspond to the identified display mode; rendering the virtual object using a rendering format that corresponds to the identified display mode; displaying the virtual object via the display.

In Example 17, the subject matter of any of Examples 1-16 includes, wherein the adjustment mechanism is to cause continuous rotation of the optical path to enable variable shapes of the virtual content field of view.

In Example 18, the subject matter of any of Examples 1-17 includes, wherein the display arrangement forms part of an OST display arrangement, the display is offset from a gaze path associated with the XR device, and the OST display arrangement further comprises an optical combiner to direct light originating from the display into the gaze path to enable the user to view the virtual content.

Example 19 is a display arrangement for a head-wearable XR device, the display arrangement comprising: a display to display virtual content; one or more optical elements to direct the virtual content along an optical path to an eye of a user of the XR device, the virtual content being presented in a virtual content field of view; and an adjustment mechanism to alter the optical path so as to adjust the virtual content field of view between at least two display modes.

Example 20 is a method performed by a head-wearable XR device that includes, a display arrangement, the method comprising: displaying virtual content via a display of the display arrangement; directing, via one or more optical elements of the display arrangement, the virtual content along an optical path to an eye of a user of the XR device, the virtual content being presented in a virtual content field of view; and altering, by an adjustment mechanism of the display arrangement, the optical path so as to adjust the virtual content field of view between at least two display modes.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A head-wearable extended reality (XR) device that includes a display arrangement, the display arrangement comprising:

a display to display virtual content;

one or more optical elements to direct light from the display displaying the virtual content along a first optical path from the display to an eye of a user of the XR device, the virtual content being presented in a virtual content field of view, the virtual content field of view being a segment of a device field of view observable by the user through the XR device;

an adjustment mechanism to rotate the one or more optical elements to redirect the light from the display along a second optical path to cause an adjustment of the virtual content field of view between at least two display modes corresponding with the first optical path and the second optical path, wherein the adjustment mechanism provides feedback data to indicate one or more current rotational positions of the one or more optical elements; and a synchronization system to receive the feedback data and to render the virtual content on the display to be aligned with the one or more optical elements as the one or more optical elements are rotated, wherein the synchronization system adjusts rendering of the virtual content based on the one or more current rotational positions.

2. The XR device of claim 1, wherein the adjustment of the virtual content field of view comprises adjustment of an aspect ratio of the virtual content field of view from a viewing perspective of the user.

3. The XR device of claim 1, wherein a first display mode corresponding with the first optical path is a portrait mode, a second display mode corresponding with the second optical path is a landscape mode, and the synchronization system renders the virtual content on the display to be aligned with the one or more optical elements as the one or more optical elements are rotated between the portrait mode to the landscape mode.

4. The XR device of claim 1, wherein the adjustment mechanism is to redirect the light from the display along the second optical path by adjusting at least one of the display or the one or more optical elements.

5. The XR device of claim 4, wherein the adjustment mechanism is to redirect the light from the display along the second optical path by causing rotation of at least one of the display or the one or more optical elements.

6. The XR device of claim 4, wherein the adjustment mechanism is to redirect the light from the display along the second optical path by causing displacement of at least a subset of the one or more optical elements into or out of the first optical path.

7. The XR device of claim 1, wherein the XR device comprises an optical assembly that includes the display and the one or more optical elements, and the adjustment mechanism is to redirect the light from the display along the second optical path by causing rotation of the optical assembly.

8. The XR device of claim 1, wherein the one or more optical elements comprise at least one of a focusing lens, a prism, or a mirror.

9. The XR device of claim 1, wherein the XR device further comprises:

at least one processor; and a memory storing instructions that, when executed by the at least one processor, configure the XR device to perform operations comprising:

detecting a mode adjustment trigger; and in response to detecting the mode adjustment trigger, causing the adjustment mechanism to adjust the virtual content field of view from a first display mode of the at least two display modes to a second display mode of the at least two display modes, the first display mode corresponding with the first optical path, and the second display mode corresponding with the second optical path.

10. The XR device of claim 1, wherein the adjustment mechanism continuously rotates the one or more optical elements and the synchronization system renders the virtual content on the display to be aligned with the one or more optical elements to generate a circular or elliptical field of view.

11. The XR device of claim 9, wherein the mode adjustment trigger is detected based on a content type of the virtual content.

12. The XR device of claim 9, wherein the mode adjustment trigger is detected based on application data of an XR application executing at the XR device.

13. The XR device of claim 12, wherein the detection of the mode adjustment trigger comprises:

detecting launching of the XR application; and processing the application data to identify that the XR application is associated with the second display mode.

14. The XR device of claim 9, wherein the mode adjustment trigger is detected based on user input received from the user of the XR device during a user session, and the operations comprise switching from the first display mode to the second display mode during the user session.

15. The XR device of claim 9, wherein the operations further comprise:

adjusting a rendering format of the virtual content to synchronize the virtual content with the second display mode of the virtual content field of view.

16. The XR device of claim 1, wherein the virtual content comprises a virtual object, and the XR device further comprises:

at least one processor; and a memory storing instructions that, when executed by the at least one processor, configure the XR device to perform operations comprising:

identifying a display mode from among the at least two display modes;

causing the adjustment mechanism to adjust the virtual content field of view to correspond to the identified display mode;

rendering the virtual object using a rendering format that corresponds to the identified display mode; and displaying the virtual object via the display.

17. The XR device of claim 1, wherein the adjustment mechanism is a magnetic actuator to cause at least a subset of the one or more optical elements to change an orientation of the virtual content field of view.

18. The XR device of claim 1, wherein the display arrangement forms part of an optical see-through (OST) display arrangement, the display is offset from a gaze path associated with the XR device, and the OST display arrangement further comprises an optical combiner to direct light originating from the display into the gaze path to enable the user to view the virtual content.

19. A display arrangement for a head-wearable extended reality (XR) device, the display arrangement comprising:

a display to display virtual content;

one or more optical elements to direct light from the display displaying the virtual content along a first optical path from the display to an eye of a user of the XR device, the virtual content being presented in a virtual content field of view, the virtual content field of view being a segment of a device field of view observable by the user through the XR device;

an adjustment mechanism to rotate the one or more optical elements to redirect the light from the display along a second optical path to cause an adjustment of the virtual content field of view between at least two display modes corresponding with the first optical path and the second optical path, wherein the adjustment mechanism provides feedback data to indicate one or more current rotational positions of the one or more optical elements; and a synchronization system to receive the feedback data and to render the virtual content on the display to be aligned with the one or more optical elements as the one or more optical elements are rotated, wherein the synchronization system adjusts rendering of the virtual content based on the one or more current rotational positions.

20. A method performed by a head-wearable extended reality (XR) device that includes a display arrangement, the method comprising:

displaying virtual content via a display of the display arrangement;

directing, via one or more optical elements of the display arrangement, light from the display displaying the virtual content along a first optical path from the display to an eye of a user of the XR device, the virtual content being presented in a virtual content field of view, the virtual content field of view being a segment of a device field of view observable by the user through the XR device;

redirecting, by an adjustment mechanism of the display arrangement, the light from the display along a second optical path to cause an adjustment of the virtual content field of view between at least two display modes corresponding with the first optical path and the second optical path, wherein the adjustment mechanism rotates the one or more optical elements to redirect the light, and the adjustment mechanism provides feedback data to indicate one or more current rotational positions of the one or more optical elements; and rendering, by a synchronization system, the virtual content on the display to be aligned with the one or more optical elements as the one or more optical elements are rotated, wherein the synchronization system receives the feedback data and adjusts rendering of the virtual content based on the one or more current rotational positions.

* * * * *